US006747953B1

United States Patent
Qureshi et al.

(10) Patent No.: US 6,747,953 B1
(45) Date of Patent: Jun. 8, 2004

(54) METHOD AND APPARATUS FOR CONGESTION CONTROL FOR PACKET-BASED NETWORKS USING CALL BLOCKING

(75) Inventors: Muhammed A. Qureshi, Metuchen, NJ (US); Enriq Hernandez-Valencia, Highlands, NJ (US); Kun I. Park, Holmdel, NJ (US); Yung-Terng Wang, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/578,071

(22) Filed: May 24, 2000

(51) Int. Cl.[7] .............................................. G01R 31/08
(52) U.S. Cl. .................................. 370/235; 370/395.21
(58) Field of Search .................................. 370/229, 230, 370/230.1, 231, 232, 233, 234, 235, 395.2, 395.21

(56) References Cited

U.S. PATENT DOCUMENTS

| | | | | |
|---|---|---|---|---|
| 5,280,483 A | * | 1/1994 | Kamoi et al. ................ | 370/234 |
| 5,335,222 A | * | 8/1994 | Kamoi et al. ................ | 370/230 |
| 5,696,764 A | * | 12/1997 | Soumiya et al. ........ | 370/395.41 |
| 5,936,958 A | * | 8/1999 | Soumiya et al. ........ | 370/395.43 |
| 6,067,287 A | * | 5/2000 | Chung-Ju et al. ............ | 370/232 |
| 6,169,738 B1 | * | 1/2001 | Sriram et al. .......... | 370/395.21 |
| 6,363,052 B1 | * | 3/2002 | Hosein ........................ | 370/230 |
| 6,584,110 B1 | * | 6/2003 | Mizuta et al. .............. | 370/401 |

* cited by examiner

Primary Examiner—Kwang Bin Yao

(57) ABSTRACT

The invention pertains to methods and apparatus for determining when and how to perform communication network congestion control tactics, such as call blocking, with respect to packet-based networks.

45 Claims, 23 Drawing Sheets

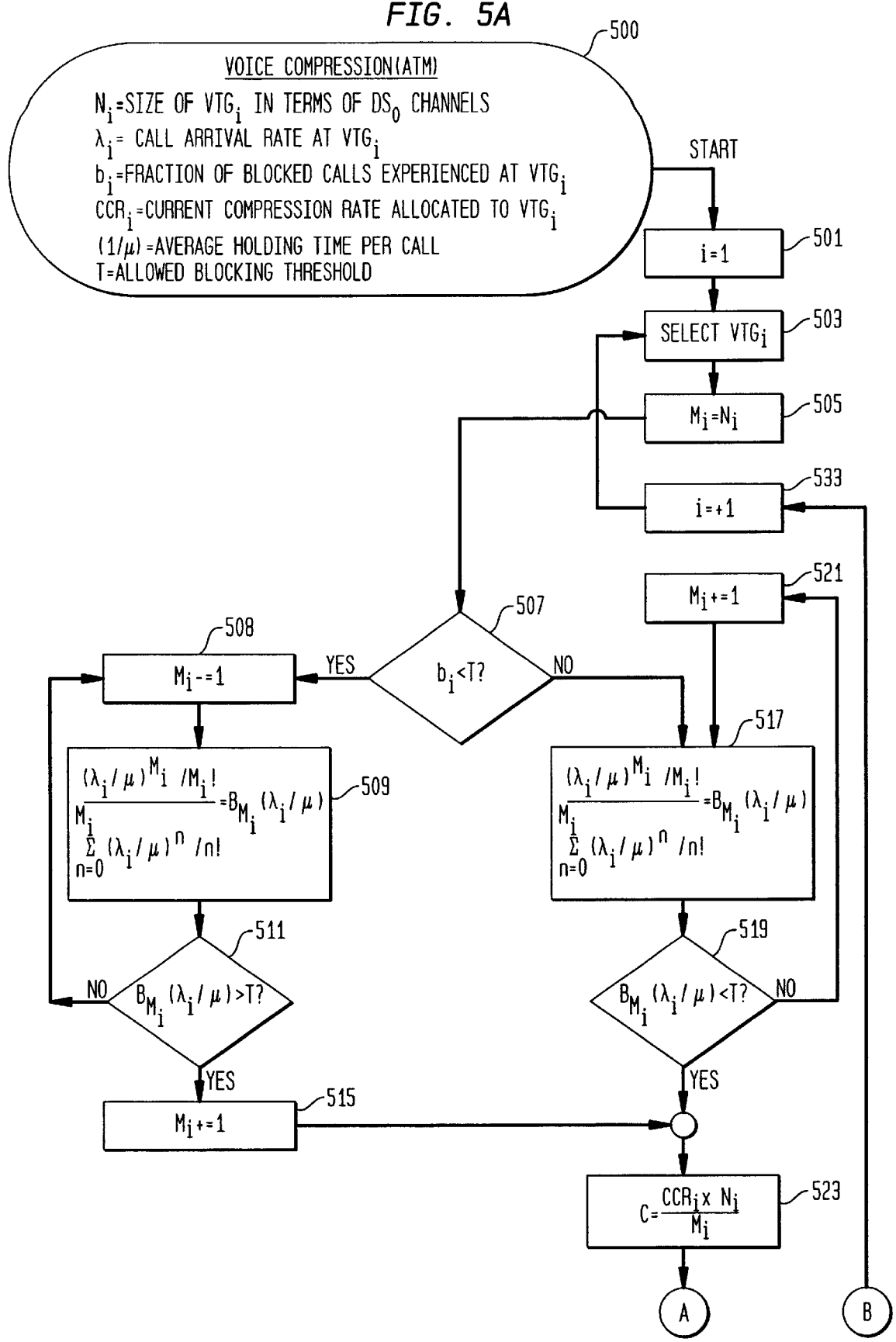

FIG. 6A

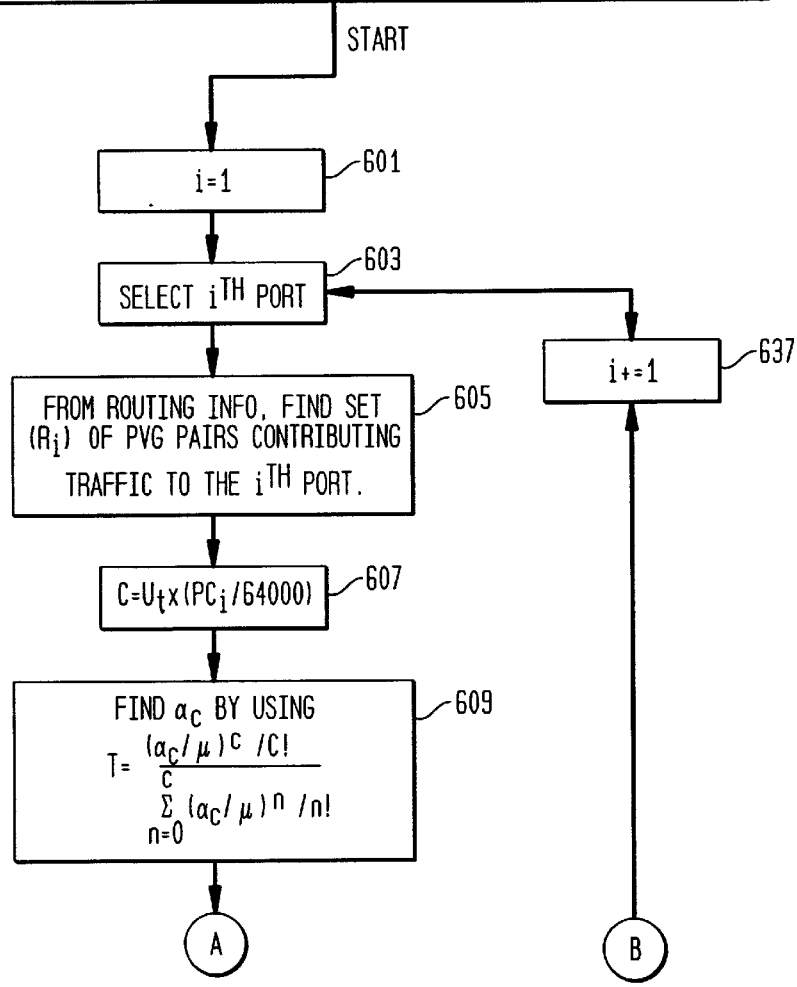

CALL BLOCKING (UNAVAILABILITY OF RTP MEASUREMENTS)

$PU_i$ = UTILIZATION OF $i^{th}$ PORT $PC_i$ = CAPACITY OF $i^{th}$ PORT $U_t$ = UTILIZATION THRESHOLD $\lambda_k$ = CALL ARRIVAL RATE FOR $k^{th}$ PVG PAIR $N_k$ = NUMBER OF CALLS FOR WHICH BANDWIDTH IS ALLOCATED TO $k^{th}$ PVG PAIR $p_{B_i}$ = BANDWIDTH REDUCTION CORRECTION FACTOR DUE TO THE $i^{th}$ PORT $p_{G_i}$ = BANDWIDTH INCREMENTAL CORRECTION FACTOR DUE TO THE $i^{th}$ PORT $f_k$ = BANDWIDTH REDUCTION CORRECTION FACTOR ASSIGNED TO THE $k^{th}$ PVG PAIR $e_k$ = BANDWIDTH INCREMENTAL CORRECTON FACTOR ASSIGNED TO THE $k^{th}$ PVG PAIR $B_k$ = ASSIGNED BLOCKING PROBABILITY TO THE $k^{th}$ PVG PAIR $(1/\mu)$ = AVERAGE CALL HOLDING TIME

T = BLOCKING THRESHOLD

START

601: i = 1

603: SELECT $i^{TH}$ PORT

605: FROM ROUTING INFO, FIND SET $(R_i)$ OF PVG PAIRS CONTRIBUTING TRAFFIC TO THE $i^{TH}$ PORT.

607: $C = U_t \times (PC_i / 64000)$

609: FIND $a_C$ BY USING
$$T = \frac{(a_C/\mu)^C / C!}{\sum_{n=0}^{C} (a_C/\mu)^n / n!}$$

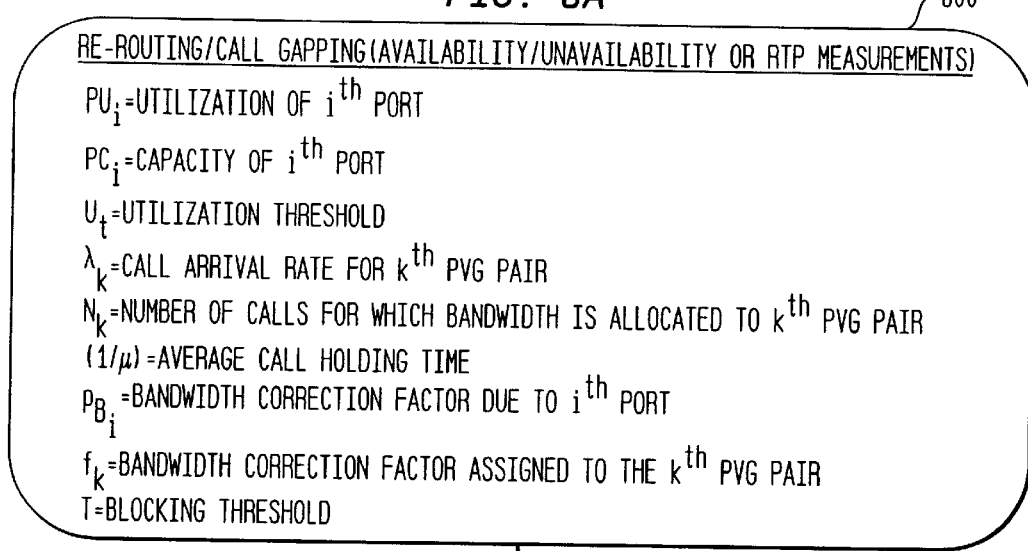

RE-ROUTING/CALL GAPPING (AVAILABILITY/UNAVAILABILITY OR RTP MEASUREMENTS)

$PU_i$ = UTILIZATION OF $i^{th}$ PORT $PC_i$ = CAPACITY OF $i^{th}$ PORT $U_t$ = UTILIZATION THRESHOLD $\lambda_k$ = CALL ARRIVAL RATE FOR $k^{th}$ PVG PAIR $N_k$ = NUMBER OF CALLS FOR WHICH BANDWIDTH IS ALLOCATED TO $k^{th}$ PVG PAIR $(1/\mu)$ = AVERAGE CALL HOLDING TIME $p_{B_i}$ = BANDWIDTH CORRECTION FACTOR DUE TO $i^{th}$ PORT $f_k$ = BANDWIDTH CORRECTION FACTOR ASSIGNED TO THE $k^{th}$ PVG PAIR

T = BLOCKING THRESHOLD

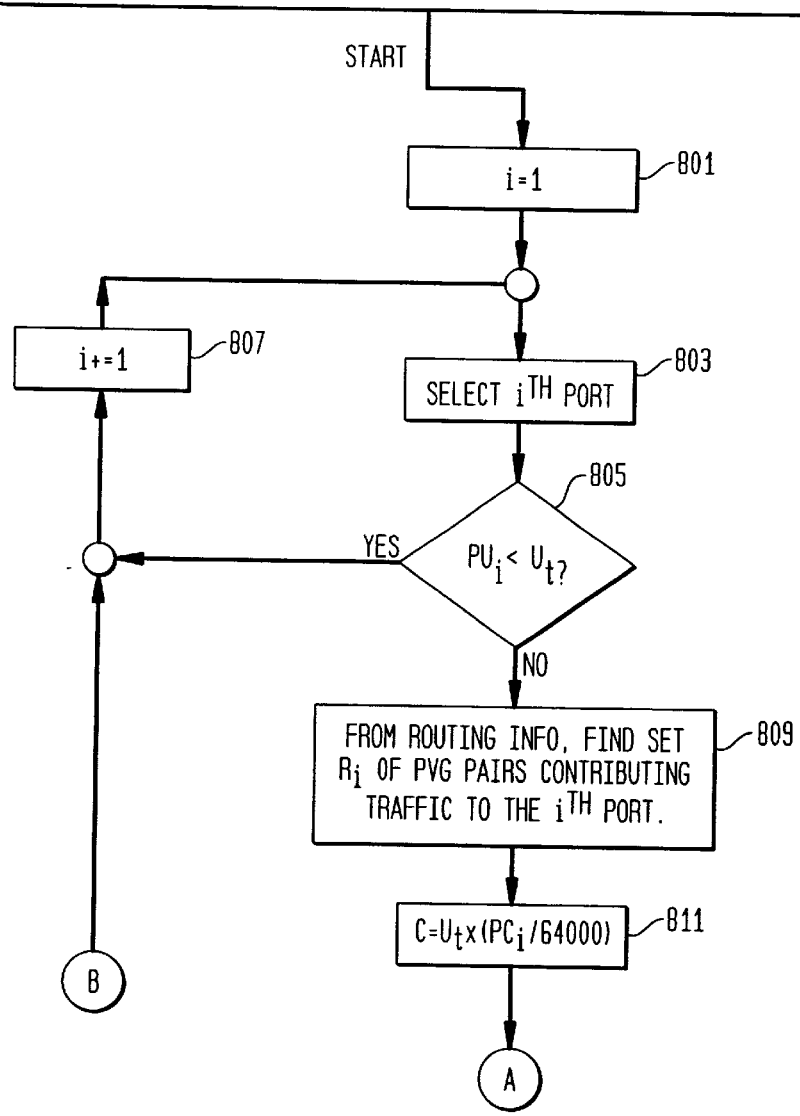

FIG. 9A

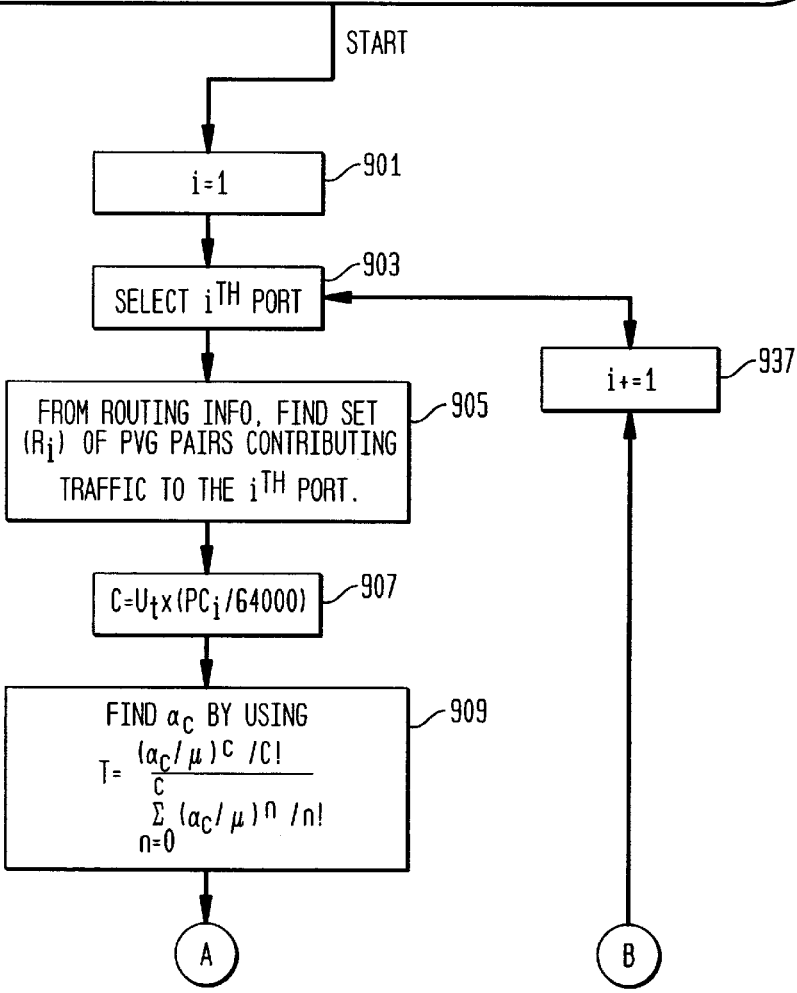

COMPRESSION (AVAILABILITY/UNAVAILABILITY OF RTP MEASUREMENTS)

$U_i$ = UTILIZATION OF $i^{th}$ PORT $PC_i$ = CAPACITY OF $i^{th}$ PORT $U_t$ = UTILIZATION THRESHOLD $\lambda_k$ = CALL ARRIVAL RATE FOR $k^{th}$ PVG PAIR $N_k$ = NUMBER OF CALLS FOR WHICH BANDWIDTH IS ALLOCATED TO $k^{th}$ PVG PAIR $CCR_k$ = CURRENT COMPRESSION RATE ALLOCATED TO $k^{th}$ PVG PAIR $p_{B_i}$ = BANDWIDTH REDUCTION FACTOR DUE TO THE $i^{th}$ PORT $p_{G_i}$ = BANDWIDTH INCREMENTAL FACTOR DUE TO THE $i^{th}$ PORT $f_k$ = BANDWIDTH REDUCTION CORRECTION FACTOR ASSIGNED TO THE $k^{th}$ PVG PAIR $e_k$ = BANDWIDTH INCREMENTAL CORRECTON FACTOR ASSIGNED TO THE $k^{th}$ PVG PAIR $(1/\mu)$ = AVERAGE CALL HOLDING TIME

T = BLOCKING THRESHOLD

START

901: i=1

903: SELECT $i^{TH}$ PORT

905: FROM ROUTING INFO, FIND SET $(R_i)$ OF PVG PAIRS CONTRIBUTING TRAFFIC TO THE $i^{TH}$ PORT.

907: $C = U_t \times (PC_i / 64000)$

909: FIND $\alpha_C$ BY USING
$$T = \frac{(\alpha_C/\mu)^C / C!}{\sum_{n=0}^{C} (\alpha_C/\mu)^n / n!}$$

937: i += 1

(A)  (B)

METHOD AND APPARATUS FOR CONGESTION CONTROL FOR PACKET-BASED NETWORKS USING CALL BLOCKING

FIELD OF INVENTION

The invention pertains to congestion control for communications networks and, particularly, packet-based voice communications networks.

BACKGROUND OF THE INVENTION

The use of packet-based networks for communicating data between various locations is well known. Packet-based networks also are increasingly being used to carry voice or combined voice and data traffic. Particularly, public telephone companies are using packet-based networks as part of the public telephone networks. The two types of packet-based networks in most common use today are ATM (Asynchronous Transfer Mode) networks and IP (Internet Protocol) networks. The small but growing number of networks which use either of these types of packet-based networks for transmitting voice (or voice and data) are termed VTOA (Voice Traffic Over ATM) and VoIP (Voice-over-IP) networks, respectively.

In packet-based networks, data streams transferred between two nodes of the network are transferred in discrete packets. Packets may be of consistent size or may be variably sized. Each packet includes a field of data which may be preceded and/or followed by non-data information such as preamble and housekeeping information (such as data source and destination addresses and the like). The data source destination fields of the packet are used by the switches and routers in the network to route the data through network nodes from source node to destination node.

The destination node reconstructs the data in the proper order based on the housekeeping information to accurately recreate the transmitted data stream. Accordingly, a continuous stream of data can be generated at a source node of the network, transmitted in separate packets (which can even travel separate routes) to the destination node and be reassembled at the receiving node to recreate a continuous stream of receive data. The fact that the data was packetized for transmission and reassembled is transparent to the users at the source and destination nodes.

However, when congestion on the network exceeds the physical capabilities of the network, i.e., the amount of data that must be transmitted via the network for all of its source-destination node pairs exceeds the physical capabilities of the network, packets get dropped and the apparently seamless transmission of data falls apart. Particularly, using a voice link as an example, transmission links in which packets are being dropped will have noticeably reduced audio quality. The receiving party may perceive noise, delay jitter and even gaps in the received voice transmission. Delay jitter occurs when the packets do not arrive quickly enough to be recreated seamlessly to produce a continuous stream of data. Noise and gaps appear when packets are completely dropped.

FIG. 1 is a block diagram of an exemplary communication network 10, including a packet-based communication sub-network 12. The packet-based sub-network 12 of FIG. 1 forms a portion of an overall telephone communications system 10 in this particular example. The packet-based network 12 interconnects a plurality of public service telephone networks (PSTNs) 14. In other words, some nodes of the packet-based network 12 are gateway nodes through which data from other networks, for example, time division multiplexed (TDM) PSTN networks 14 is transferred. The network nodes through which the PSTNs are coupled to the packet-based network are termed gateways. The gateways 18 convert voice data from the protocol of the PSTN networks 14 (e.g., a TDM protocol) to the protocol of the packet-based network 12 (i.e., packets).

Using voice data being transmitted from PSTN 14a to PSTN 14b as an example, gateway 18a converts the TDM voice into packet voice and transmits it to an edge switch or edge router 20a. From edge router 20a, the data is directed to edge router 20b, preferably, directly. However, the data may be routed through one or more switches and/or routers 24. Edge router 20b directs the packets to gateway 18b, where packet voice data is converted to the TDM format and then forwarded on the PSTN network 14b.

The term edge switch or edge router refers to a device that is primarily responsible for performing network access functions for the packet-based network, such as low level traffic classification, aggregation and management. As its name implies, an edge switch or edge router typically is coupled directly to a gateway into the network, i.e., it is at the edge of the packet-based network. The network further comprises core switches and core routers 24. Both of these terms refer to devices that perform larger scale traffic classification, aggregation and management.

There are several known mechanisms for handling congestion in communications networks. For instance, call blocking is a mechanism by which new calls (i.e., source/destination node pairs) are not accepted by the network when the quality of existing calls starts degrading due to congestion. Another method known for reducing congestion at the congested point is by rerouting calls in the PSTN networks. Particularly, the TDM networks may be coupled to the central packet-based network at multiple gateways. If a path through one particular gateway is congested, the PSTN network can reroute calls to another gateway through which less congested paths in the packet-based network can be accessed.

It is also possible to use compression algorithms to reduce the bandwidth needed for a call and thus allow more calls to be accommodated. With respect to voice communications, many voice compression algorithms are known. However, compression typically leads to loss of information. Generally, the greater the amount of compression, the greater the loss of data. In connection with voice communications, generally, the greater the amount of compression, the lower the audio quality of the call.

Call gapping in the PSTN networks is another possible mechanism for reducing congestion.

It is an object of the present invention to provide a network congestion management method and apparatus for use in connection with packet-based networks.

SUMMARY OF THE INVENTION

The invention is a method and apparatus for congestion management in a packet-based network that interconnects a plurality of peripheral networks. We disclose a method and apparatus by which the amount of congestion is quantified and particular corrective actions and the level of those corrective actions necessary to eliminate or reduce data loss is generated. The generated data may be transferred to those network elements (or the peripheral networks) which can implement the indicated corrective actions or may be implemented automatically by a centralized network congestion manager circuit (e.g., a dedicated digital signal processor). The system operates essentially in real time. Among the corrective measures supported by the invention are reconfiguration of bandwidth pipes, call blocking, rerouting in the peripheral networks (e.g., PSTN networks that are coupled to a central packet-based network at multiple gateways), selective voice compression on new calls and call gapping in the peripheral network.

We disclose a method and apparatus for determining the congestion at the ports of a network and determining the level of call blocking needed to provide a predetermined quality of service for calls.

The network congestion management in accordance with the present invention may be a centralized system or it may be a distributed system in which multiple nodes of the network contain elements of the network congestion management hardware and software.

BRIEF DESCRIPTION OF THE DRAWINGS

FIGS. 5A and 5B comprise a flow diagram illustrating an embodiment in accordance with the present invention specifically adapted for an ATM network in which the network congestion management method and apparatus identifies virtual trunk groups that are experiencing excessive congestion and calculates information necessary for determining a level of voice compression desirable to reduce congestion to an acceptable level.

FIGS. 6A, 6B, and 6C comprise a flow diagram illustrating an embodiment of the invention specifically adapted to an IP network on which the real-time protocol is not implemented which identifies gateway pairs experiencing excessive congestion in the IP network and generates the necessary call blocking rate as a fraction of arriving calls for the identified gateway pairs in order to relieve the congestion.

FIGS. 8A, 8B, 8C, and 8D comprise a flow diagram illustrating an embodiment of the invention specifically adapted for IP networks in which the network congestion management method and apparatus identifies packet-voice gateways experiencing excessive congestion, identifies alternate source packet-voice gateways and implements call gapping and rerouting calls in the PSTN domain of peripheral networks to reduce congestion.

FIGS. 9A, 9B, 9C, and 9D comprise a flow diagram illustrating an embodiment of the invention specifically adapted for IP networks in which the network control management method and apparatus identifies congested packet voice gateway pairs whose blocking rate can be reduced by using higher compression rates and generates the necessary compression rate to bring congestion below a predetermined level.

DETAILED DESCRIPTION OF THE INVENTION

The network control management method and apparatus of the present invention can perform three critical congestion management functions, namely, (1) collection of performance related statistics from network element management systems for traffic surveillance and performance monitoring, (2) identification of potential congestion control actions to be taken by network managers on target network elements (NEs), and (3) implementation of those congestion control actions. In some embodiments, the network congestion management method and apparatus of the present invention may simply calculate and collect relevant information for informational purposes. Alternately, it may additionally forward such information to other network managers for further processing and implementation of the identified corrective actions. In other embodiments, some automatic control for implementing said actions can be included in a centralized network congestion management apparatus mechanism. The types of network elements supported by the present invention include ATM edge and core switches, IP edge and core routers (switches) and ATM and IP packet/voice gateways (PVGs).

Below we describe several preferred embodiments of the invention particularly adapted for ATM and/or IP networks. However, it should be understood that the invention is applicable to other types of packet-based networks.

For exemplary purposes and to illustrate highly practical embodiments of the invention, we assume that network congestion management capabilities for the exemplary ATM embodiments are consistent with the ATMF UNI 3.1 capabilities and, for IP networks, with the RFC-1213 capabilities.

Figure 1:
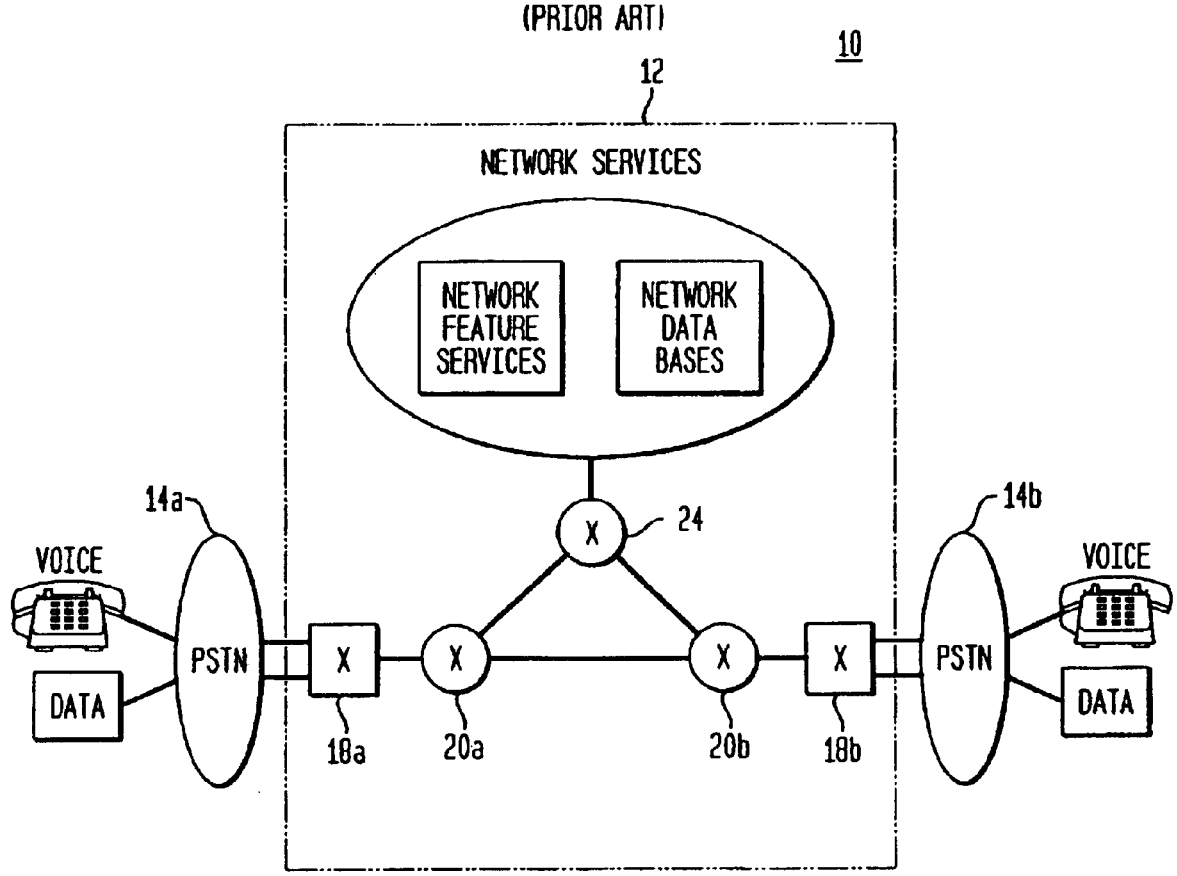
FIG. 1 is a block diagram of a telecommunications network including a central packet-based network interconnecting multiple PSTN networks in accordance with the prior art.
Figure 2:
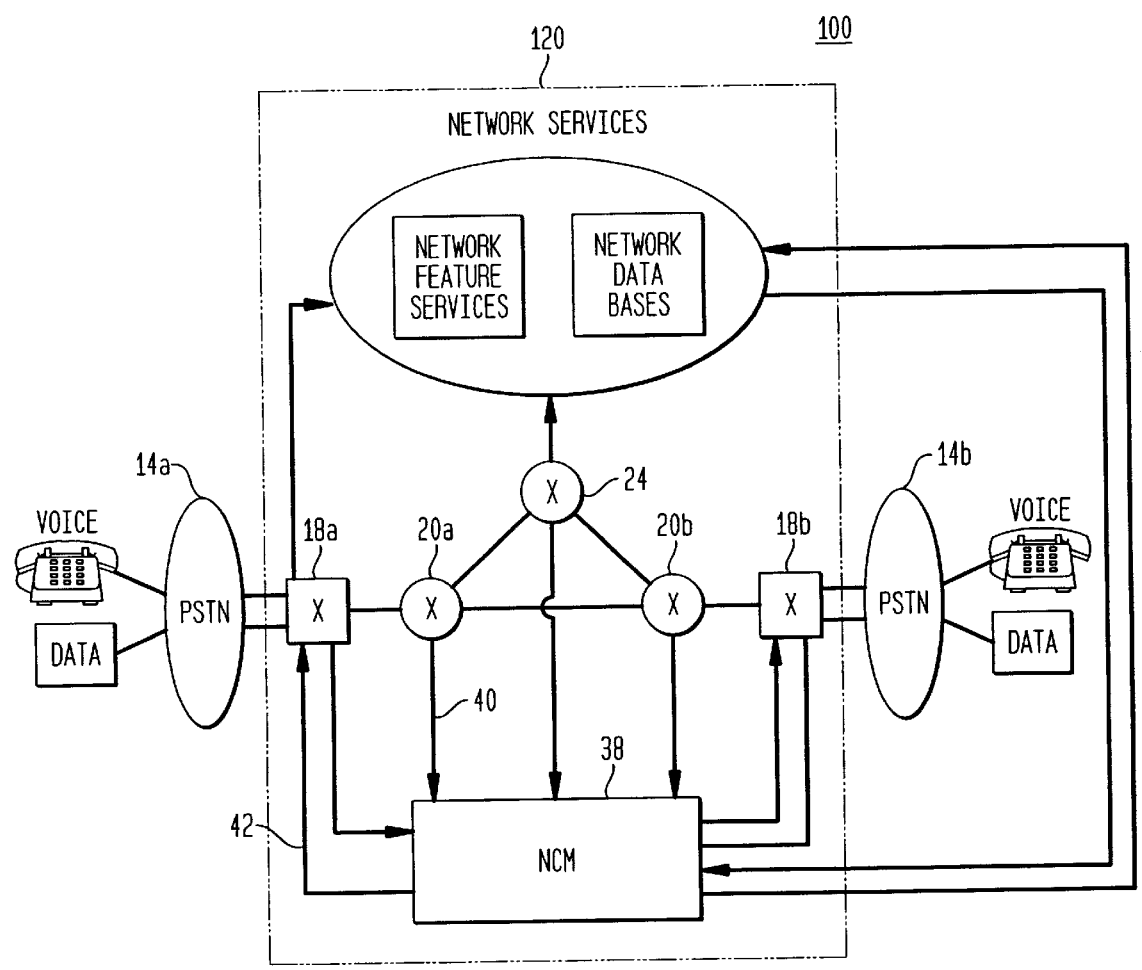
FIG. 2 is a block diagram of a telecommunications network in accordance with the present invention including a central packet-based network for interconnecting multiple PSTN networks.

FIG. 2 is a block diagram of a network system in accordance with the present invention. This exemplary network is a public telephone network and therefore has certain predetermined parameters. For instance, each call has a bandwidth of 64 Kbps. The network congestion management in accordance with the present invention is centralized in this embodiment. However, it should be understood that the network congestion management hardware and software in accordance with the present invention also can be distributed throughout the network, such as at individual gateway nodes 18.

The packet-based network 120 interconnects a plurality of public service telephone networks (PSTNs). The gateways 18 convert data from the protocol of the PSTN networks 14

(a TDM protocol) to the protocol of the packet-based network 120 (i.e., packets).

Using voice data being transmitted from PSTN 14*a* to PSTN 14*b* as an example, gateway 18*a* converts the TDM voice data into packet voice and transmits it to an edge switch or edge router 20*a*. From edge router 20*a*, packets are directed to edge router 20*b*. The transfer between edge router 20*a* and edge router 20*b* may be direct or packets may be routed through one or more core switches and/or routers, such as switch/router 24. Edge router 20*b* directs packets to gateway 18*b*, where packet voice is converted to the TDM format of PSTN network 14*b* and forwarded to that network.

The network congestion manager (NCM) 38 receives traffic information from the various network elements, including packet gateways, edge switches, edge routers, core switches and core routers over control lines 40 and returns traffic control information to them over control lines 42. The NCM may comprise any appropriate type of data processing device such as a microprocessor, micro controller, state machine or combinational logic.

The NCM in accordance with the present invention should be adapted to the particular network traffic information available from the network elements. For instance, most ATM networks have a greater amount of traffic control and information than IP networks.

Below, the invention will first be described in connection with an ATM network having all the network traffic and congestion management capabilities in support of the ATMF UNI 4.0 specifications as well as ATMF VTOA/AAL2 services. In this embodiment, the congestion control mechanisms are targeted to the gateway devices. However, it should be understood that the invention is equally applicable to any other type of network element, including the edge and core switches and routers as well as IP Network Access Servers.

In a preferred ATM embodiment, the network congestion management is based primarily on the IETF simple network management protocol (SNMPv2) network management framework. The SNMPv2 framework consist of the following components.

RFC 1902: SMI definition, the mechanisms used for describing and naming objects for the purpose of management;

RFC 1903: Textual conventions for version two of the SNMPv2;

RFC 1904: Conformance statements for SNMPv2;

RFC 1905: Protocol operations for SNMPv2;

RFC 1906: Transport mappings for SNMPv2;

RFC 1907: Management information base for SNMPv2; and

RFC 1908: Co-existence between SNMPv1 and SNMPv2. Further, the invention will be described with respect to a network utilizing standardized MIB (Management Information dataBase) data. However, it should be understood that the present invention is adaptable to any MIB protocol.

I. Congestion Indicators

Many packet-based networks, and particularly ATM networks, already generate a significant amount of information indicative of the amount of congestion at or between various network elements. These include call blocking data, transport loss data, transport delay data and transport jitter (delay variability) data.

Call blocking applies to network elements where admission control, either via an explicit admission control function or implicit due to resource contention and blocking, is exercised. Call blocking is used as a congestion management parameter in PSTN TDM networks and ATM packet-based networks. It is less prevalent with respect to IP packet-based networks because of the connectionless nature of the service provided by IP networks and the lack of end-to-end Quality-of-Service management support.

In ATM networks, a threshold for call blocking for a network element, such as a gateway, may be set. If the amount of call blocking occurring at that network element exceeds the threshold, it is typically an indication of insufficient network resources allocated to meet the presently existing traffic demand at that node.

Transport loss, transport delay and transport jitter apply mostly to packet-based networks rather than TDM networks as a measure of congestion.

Other indicators of network congestion include resource utilization information, the number of active calls and the receive buffer overflow or underflow information at gateways. Resource utilization is usually given as a percentage of the total capacity and can be used as an implicit indicator of congestion for networks which do not support a more direct indication of congestion. The number of active calls also is an obvious implicit indicator of congestion at a network element.

Further, both VTOA and VOIP networks utilize re-assembly buffers for receive data into the network at the packet/voice gateways. These buffers are used to reconstruct the voice stream. Re-assembly buffer overflow and underflow is an indication of excessive delay jitter and insufficient re-assembly buffer space, respectively and, thus, also is an indirect measure of congestion at the gateway.

Table 1 below shows the congestion indicator information made available by various standardized Management Information dataBase (MIB) modules.

| Parameter | ATMF RMON | ATOM MIB (RFC-1695) | TCP/IP MIB (RFC 1213) | IF & RMON MIBs (RFC 2233/2021) | RTP MIB |
|---|---|---|---|---|---|
| No. of successful call setup attempts | X | | | | |
| No. of call setup attempts | X | | | | |
| Total connection time | X | | | | |
| No. of DS0 channels | X | | | | |
| No. of transmitted cells | X | | | | |
| No. of received cells | X | | | | |
| No. of cell lost | X | | | | |
| AAL1 Buffer overflow/underflow | X | | | | |
| No. of transmitted octets | X | X | X | X | |
| No. of received octets | X | X | X | X | |
| No. of packet lost | | X | X | | X |
| Delay Jitter | | | | | X |

Congestion at network elements commonly results in decreased performance. There are several options for addressing network congestion. They include expanding the physical resources of the network such as by adding network links, utilizing bigger gateways, adding more ports, etc. Non-hardware options include (1) resizing virtual trunk groups in ATM networks in order to meet the demand at particular ports, i.e., gateways, (2) using voice compression to reduce the bandwidth of each source/destination link, (3) call gapping in the packet-based network, (4) rerouting data through the peripheral networks coupled to the packet-based network (for packet-based networks which are coupled to other networks through multiple gateways), and (5) call blocking.

II. Congestion Control Mechanisms

Table 2 below is a list of generic parameters which are useful in detecting and determining how to solve network congestion problems.

| | |
|---|---|
| N: | Virtual Trunk Group size in terms of DS0 channels |
| $\lambda(t)$: | Non-stationary call attempt or arrival rate |
| $\mu$: | Average service time per call |
| $\rho(t)$: | Non-stationary offered load |
| $B_N(t,\rho)$: | Non-stationary call blocking probability |
| $B_O$: | Blocked calls objective |
| $n(t)$ | Non-stationary number of call attempts |
| T | Polling interval |

In preferred embodiments, the network congestion management method and apparatus of the present invention monitors various performance related data and, as needed, correlates them to detect congestion-related events in the network. It then generates information as to solutions to reduce the congestion. The network congestion management method and apparatus of the present invention (hereinafter NCM) can simply calculate and store congestion information from the available congestion indicators for use by the network administrator who can then manually intervene to perform congestion relief steps (hereinafter termed a level-0 embodiment). More preferably, however, the NCM further determines recommended corrective actions and provides that information via control lines to the appropriate network elements so that they can take the necessary actions to reduce congestion (hereinafter termed a level-1 embodiment). Alternately, the NCM itself can be further equipped to automatically execute the recommended actions (hereinafter termed a level-2 embodiment).

This specification specifically discusses five congestion relief mechanisms, namely, (1) resizing of virtual trunk groups, (2) call blocking, (3) rerouting of calls in the PSTN domain, (4) voice compression, and (5) call gapping in the PSTN domain. The resizing of virtual trunk groups congestion relief mechanism is most suitable for ATM networks as opposed to IP networks, since IP networks do not utilize the concept of virtual trunk groups. However, it is possible to implement a similar scheme in IP networks, such that resizing of virtual trunk groups could also be applied to IP networks. On the other hand, the call blocking congestion relief mechanism is particularly adapted for use with IP networks because of the general absence of use of the concept of virtual pipelines (or trunk groups) in IP networks. The three other congestion relief mechanisms, however, are equally applicable to ATM and IP networks as well as other types of packet-based networks.

III. ATM Congestion Management Embodiments

A. Resizing of Virtual Trunk Groups

Figure 3A:
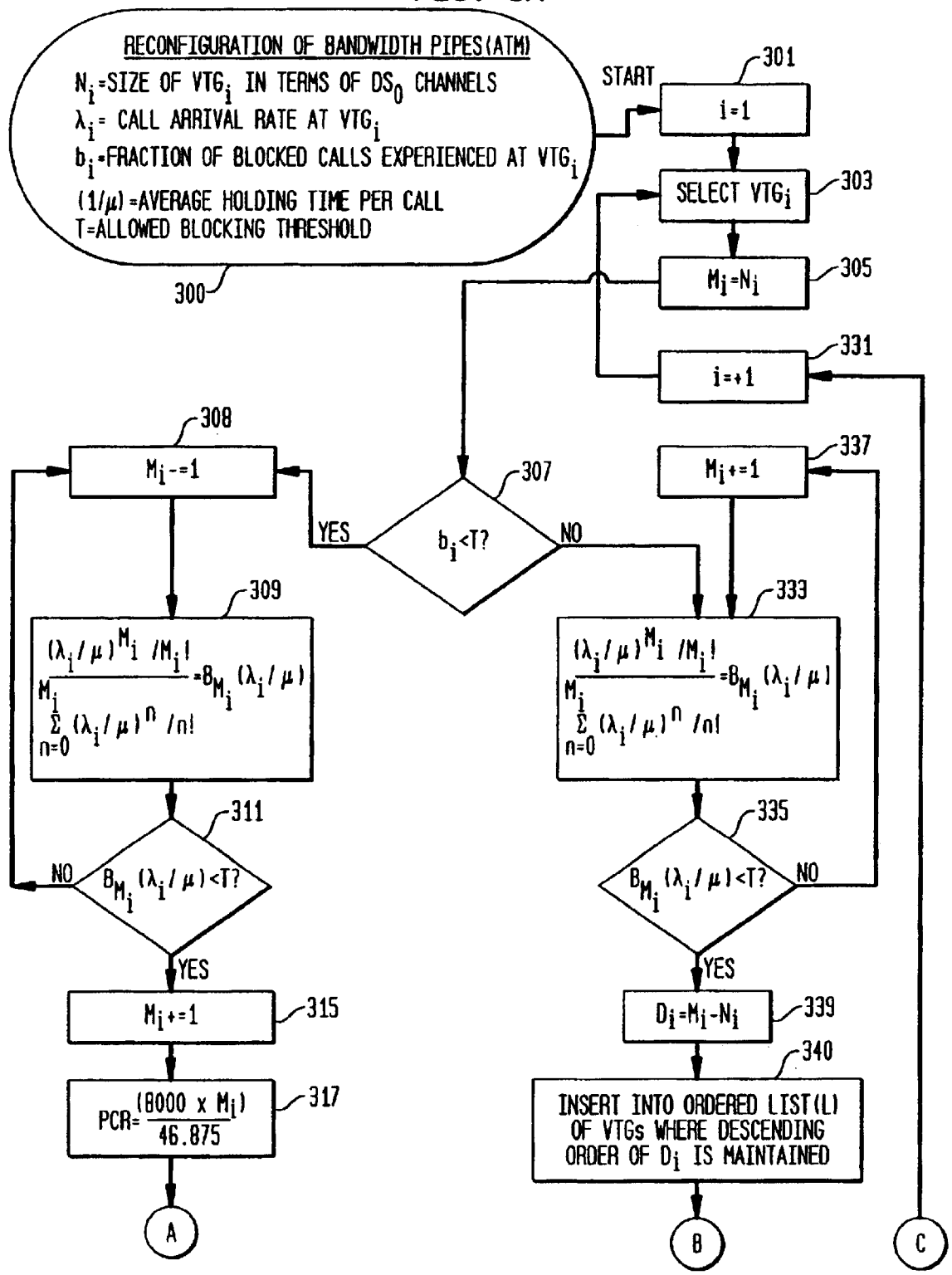
FIGS. 3A, 3B, and 3C comprise a flow diagram illustrating an embodiment in accordance with the present invention specifically adapted for an ATM network in which the network congestion management method and apparatus calculates information necessary for resizing virtual trunk groups to relieve congestion, generates proposed actions to relieve congestion and forwards the proposed action information to the network nodes capable of executing the action.
Figure 3B:
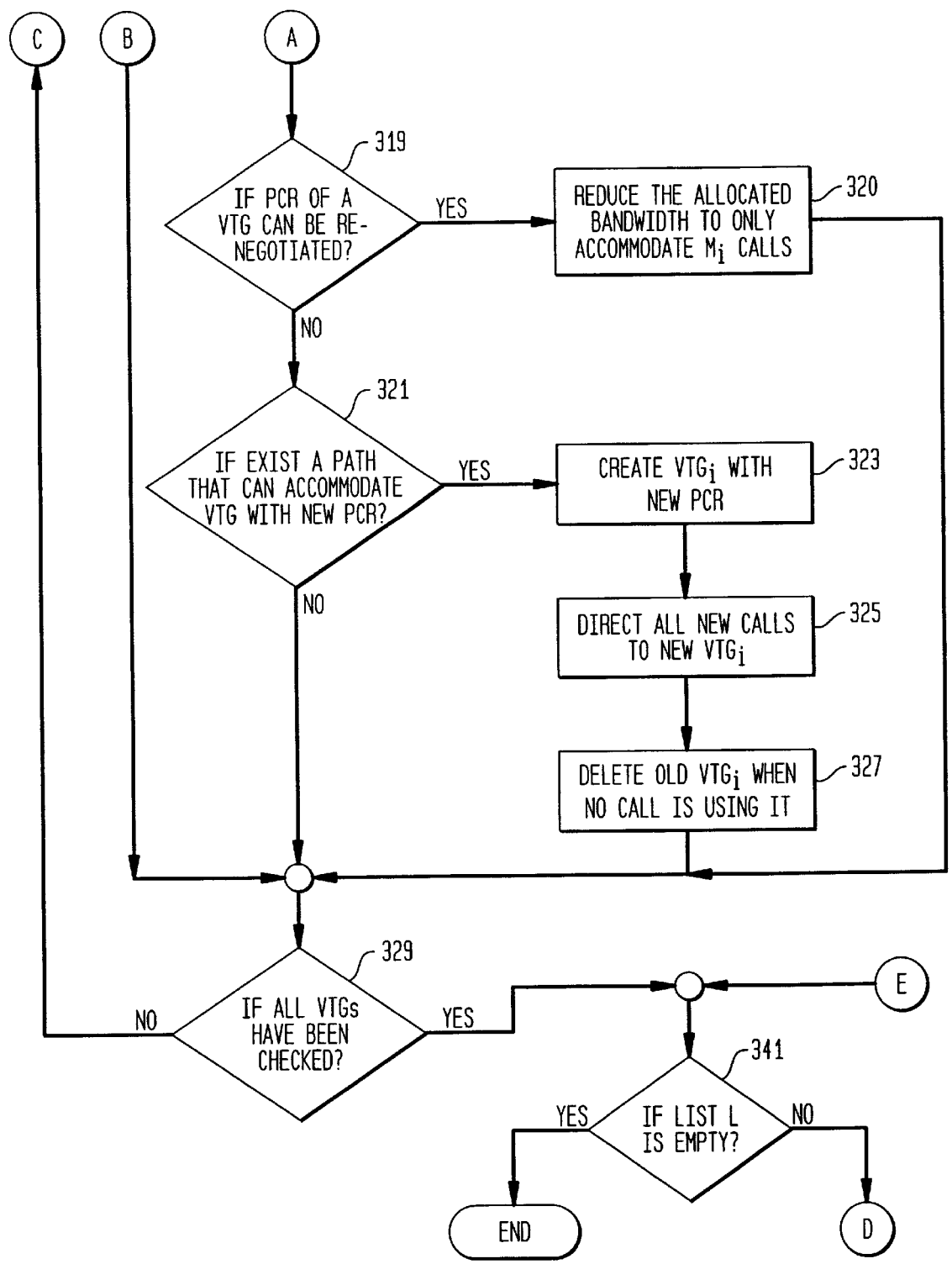
Figure 3C:
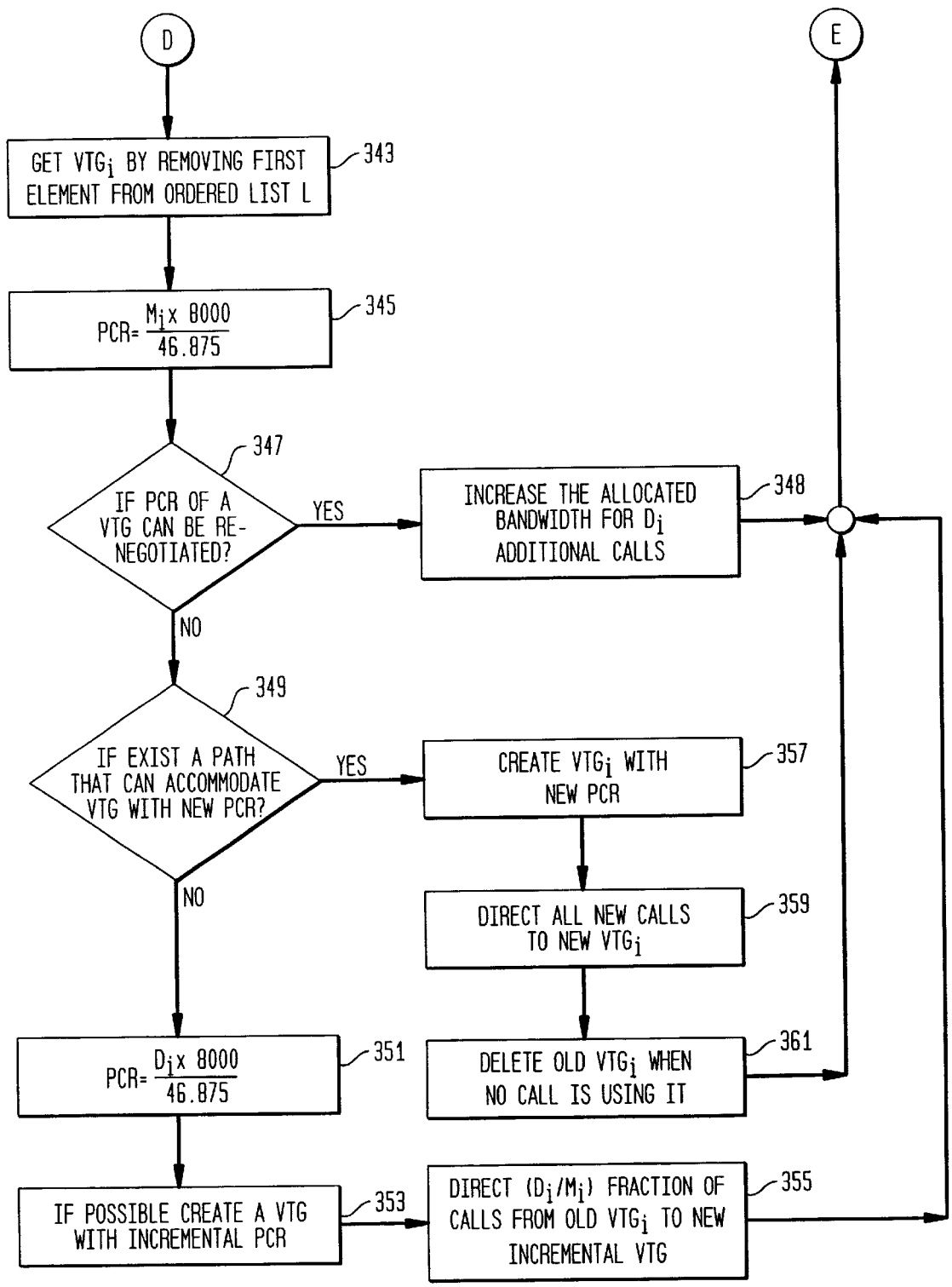

FIG. 3 is a flow diagram illustrating an embodiment of the present invention specifically adapted for, yet not limited to, ATM networks in which network congestion is managed by real-time resizing of virtual trunk groups. FIG. 3 comprises portions 3A, 3B and 3C and illustrates a level-2 embodiment in which the NCM monitors the available performance related information to detect congested virtual trunk groups (VTGs) in the network, calculates the peak cell rate (PCR) needed of a PVG in order to reduce cell blocking to a desired rate and determines available paths for resizing VTGs.

The relevant data which are readily available in ATM networks and is used herein include (1) the fraction of blocked calls per virtual trunk group (b), (2) the call arrival rate per VTG ($\lambda$), (3) the bandwidth per call (e.g., 64 Kbps for a telephone network), (4) the number of channels per virtual trunk group (N), (5) the blocking threshold (T), (6) the average holding time per call, ($1/\mu$) and (7) network connectivity and topological information.

T is a predetermined number which is set by the network administrator and represents the amount of call blocking that the system administrator deems tolerable before congestion management measures are to be taken. It can conceivably be set to 0, if desired, but usually some call blocking will be deemed acceptable in order to reduce system hardware requirements, some of which would be needed only during rare peak usage times.

Referring to FIG. 3, variable definitions are given in block 300. In step 301, variable i is set to 1. Variable i will be used to designate the various VTGs of the network. In step 303, a VTG corresponding to i is selected. In step 305, a variable $M_i$ is set to the actual size, $N_i$, of the selected VTG. The size is designated in terms of the number of DS0 channels in the VTG. In step 307, it is determined whether the fraction of blocked calls for $VTG_i$ exceeds the threshold, i.e., if $b_i>T$. If the current VTG is experiencing less call blocking than the threshold level, then it is possible that some of the bandwidth from that VTG can be reassigned to another VTG that is exceeding the call blocking threshold. Accordingly, if $b_i<T$, flow proceeds to steps 308 through 327 to resize this VTG, if possible.

In steps 308 through 315, the necessary channel capacity of the VTG is calculated. Specifically, in step 308, the VTG size is reduced by one DS0 channel for purposes of calculating whether the VTG can be reduced in size and still meet the call blocking parameter. Note that the VTG is resized for calculation purposes only, it is not actually resized until step 320, as will be described below. Given the call arrival rate ($\lambda_i$) at $VTG_i$, the average holding time ($1/\mu$) and the number of available channels ($N_i$), call blocking numbers can be computed using the well known Erlang blocking formula for a stationary queuing system. In step 309, the channel capacity for a VTG of size $M_i$ is calculated. The call blocking rate may be calculated as follows:

$$B_{M_i}(\lambda_i/\mu) = \frac{(\lambda/\mu)^{M_i}/M_i}{\sum_{n=0}^{M_i}(\lambda/\mu)^n/n!} = \frac{\rho B_N \rho}{N+1+\rho B_N(\rho)} \quad \text{(Eq. 1a)}$$

Alternately, it may be represented as:

$$B_{N-1}(\rho) = \frac{NB_N(\rho)}{\rho[1-\rho B_N(\rho)]} \quad \text{(Eq. 1b)}$$

For a non-stationary system, which is the case of particular interest, one can apply equation 1a or 1b with a non-stationary offered load given by:

$$\rho(t)=\lambda(t)/\mu(t) \qquad \text{Eq. (2a)}$$

or $$\rho(t)=[\lambda(t)-\rho(t)]/\mu(t) \qquad \text{Eq. (2b)}$$

Equation 2a is usually referred to as a point-wise stationary approximation (PSA), while equation 2b is referred to as a modified offered load (MOL) approximation. The two solutions for $\rho(t)$ are equivalent when the system is stationary, that is, when the call arrival process is independent of time.

When $\lambda(t)$ is well-known, i.e., when the arrival process is completely known as a function of time, the PSA approximation tends to overestimate the blocking probability while the MOL approximation tends to underestimate the blocking probability. In practice, the arrival process is not known ahead of time.

Typically, $\lambda(t)$ would be estimated from the accumulated number of call attempts over a time interval of length T as:

$$\lambda(t+T)=[n(t+T)-n(t)]/T \qquad \text{Eq. (3)}$$

Equation (3) tends to bias the actual call attempt rate at xt because it is an averaging operation. For models such as MOL models, the situation is more complex given that typical parameter estimation with differential operators tends to procure noisy and less stable estimators. These kinds of estimators typically are biased, and, depending on the operating regime, can overestimate or underestimate the parameter of interest. In particular, the estimator for the call attempt rate $\lambda(t)$ in equation (3) underestimates the instantaneous call attempt rate when the call rate is increasing, but it overestimates the call rate when the call rate is decreasing. Thus, the behavior of the system when all parameters are known ahead of time can be substantially different from the sample behavior. Depending on the particular circumstances, one might choose to use equations (1a) and (2a) or equations (1b) and (2b).

After the non-stationary call blocking probability for this VTG is calculated in step 309, the calculated call blocking probability is compared with the call blocking threshold in step 311. If it is greater than the call blocking threshold, this means that the VTG may be able to be further reduced in size and the extra bandwidth that is presently assigned to it can be reassigned to a congested VTG. Accordingly, flow would loop back to step 308 where the interim VTG size, $M_i$, is decremented by one more DS0 channel. The call blocking probability is then recalculated in step 309 with the smaller value of $M_i$. Steps 308, 309, and 311 are repeated until the call blocking probability is greater than the threshold. At that point, flow proceeds to step 315 where the value of $M_i$ is incremented by one to return to a VTG size that keeps the call blocking probability below the threshold. Then flow proceeds to step 317 where a peak cell rate (PCR) corresponding to channel capacity $M_i$ is computed.

Peak cell rate can be determined readily. Given the number of calls that need to be carried, the peak cell rate for structured N×64 basic service for VTOA networks can be computed as:

$$PCR = \frac{(8000 \times N)}{46.875} \text{ cells per second} \qquad \text{Eq. (4)}$$

However, peak cell rate formulation for other types of services such as unstructured BS1/E1/DS3/E3, DS1/E1 with CAS can be found in ATM forms CES Interoperability Specification version 2.0 (af-vtoa-oo78.ooo). Since the notion of virtual trunk group does not exist in current VoIP specifications, there is no standard conversion rule for peak cell rate for IP networks.

In steps 319–327, the underutilized VTGs are reduced in size to the extent possible to free up bandwidth for use in increasing the size of over-utilized VTGs. In step 319, it is inquired whether the peak cell rate of this VTG can be renegotiated (as determined in steps 308–315). If so, flow proceeds to step 320 where the allocated bandwidth to the VTG is reduced to accommodate $M_i$ calls. If not, then flow proceeds to step 321 where it is determined if a path that can accommodate the VTG with the newly calculated PCR exists. The software uses the network connectivity and topological information to determine if there are any paths that can accommodate a VTG with the bandwidth corresponding to the newly determined peak cell rate. If so, flow proceeds to step 323 where a new VTG with the new PCR is created. As shown in step 325, all new calls will be directed to the new $VTG_i$. As shown in step 327, the old $VTG_i$ will be deleted when no calls are using it any longer.

From either step 320 or step 327, flow proceeds to step 329. In step 329, it is determined if all of the VTGs in the network have been checked. If not, variable i is incremented (step 331) and flow proceeds back to step 303 for operation on the next VTG. For every VTG experiencing call blocking less than the threshold, flow again proceeds through steps 309 through 327 to reduce the size of the VTG, if possible.

For every VTG which is experiencing call blocking exceeding the call blocking threshold, flow will instead proceed from step 307 to steps 333 through 340. Particularly, step 333 is essentially identical to step 309, in which the non-stationary call blocking probability for a VTG of size $M_i$ is calculated. In step 335, it is determined if the calculated probability is less than the predetermined call blocking threshold.

If not, flow proceeds to step 337 where $M_i$ is incremented by 1 and the call blocking probability is re-calculated for the new value of $M_i$. As can be seen, flow proceeds through steps 333 through 337 until a value for $M_i$ (the size of the VTG in terms of DS0 channels), is reached such that the calculated call blocking probability is less than the call blocking threshold. When that size is determined, flow proceeds from decision step 335 to step 339. In step 339, a value $D_i$ is determined which is the difference between the present size, $N_i$, of that VTG and the just calculated VTG size, $M_i$, needed to bring the call blocking probability number below the predetermined call blocking threshold.

In step 340, the VTG is inserted into an ordered list, L, of VTGs that are exceeding the call blocking threshold. The list is ordered such that the VTG corresponding to the highest value for $D_i$ is listed first and the VTG corresponding to the lowest value of $D_i$ is listed last. Flow then proceeds to step 329 to determine if all VTGs have been checked. If not, i is incremented (step 331) and flow returns to step 303 for processing of the next VTG.

When all VTGs have been checked, flow proceeds to decision step 341. If no VTGs made it onto list L, (i.e., if no VTGs are overly congested), then the operation ends since no congestion relief operations are necessary. However, if there is at least one VTG in list L, flow proceeds to step 343.

In step 343, the first VTG is removed from list L. In step 345, a peak cell rate for the desired size of that VTG is calculated using equation (4). In step 347, it is inquired if the PCR of a VTG can be re-negotiated in this network. If so, flow proceeds to step 348 where the bandwidth of the VTG is increased. Then flow returns to step 341 to move on to the next VTG in list L, if any.

If, on the other hand, the network cannot re-negotiate VTG size, flow proceeds to step 349. In step 349, it is determined if a path exists that can accommodate a new VTG having $M_i$ DSO channels. If so, flow proceeds to step 357 where such a VTG is created. As shown in step 359, all new calls are then directed to the new VTG. Then, as shown in step 361, when no calls are using the old $VTG_i$ any longer, the old $VTG_i$ is deleted. Flow then proceeds back to step 341 so that the next VTG in list L, if any, can be operated upon.

If, however, in step 349, there is no such path, flow proceeds to step 351. In step 351, a peak cell rate is calculated for a number of DSO channels, $D_i$, where $D_i$ is the difference between the actual number of channels in $VTG_i$ and the number of channels for $VTG_i$ needed to reduce the call blocking probability below the predetermined call blocking threshold. ($D_i$ was determined in step 339).

Flow then proceeds to step 353 where, if possible, a new VTG of a size that can accommodate $D_i$ channels is created. Flow then proceeds to step 355 where $$\frac{D_i}{M_i}$$

of the calls from the old VTG are directed to the new VTG created in step 353. Flow then proceeds back to step 341 in order to process the next VTG, if any, in list L.

The flow chart of FIG. 3 describes a level-2 implementation of the present invention. It should be understood by those skilled in the art that a level 0 implementation would include only steps 301, 303, 305, 307, 333, 335, 339, 340, 329, 341, 343 and 345. In step 335, flow would proceed back to step 331. An affirmative response in step 307 would cause flow to proceed back to step 331.

Further, those of skill in the art also will understand that a level-1 implementation in accordance with the present invention would be essentially the same as described in connection with the level-2 embodiment of FIG. 3, but without the implementation steps, such as steps 320, 323, 325, 327, 353, 355, 357, 359 and 361.

The following implementation considerations should be noted. As noted above, the point-wise stationary approximation (PSA) model for the offered load utilized in equations 1a and 2a shows a strong correlation to the stochastic behavior of the estimated call attempt rate. Thus, a straightforward implementation of the PSA model would result in under-estimation of the required VTG size. Also as noted above, the discreet implementation of the modified offered load (MOL) model utilized in equation 2b (hereinafter termed D-MOL) would be $$\rho(t) = \frac{\lambda(t)}{\mu} \times \mu T + \rho(t-T) \times [1 - \mu T]$$

Yet, being a discrete approximation of the exact MOL model, such discrete steps can produce unstable estimators over certain operational regimes, particularly with decreasing call rates over time. A simple fix is to use the D-MOL model to estimate the call attempt rate when call rate has been historically increasing over time and use the PSA model when call rate has been historically decreasing over recent time. Thus, $$\rho(t+T) = \frac{\lambda(t)}{\mu} \qquad \text{PSA Model}$$

$$\rho(t+T) = \frac{\lambda(t)}{\mu} \times \mu T + \rho(t+T) \times [1 - \mu T] \qquad \text{DMOL Model}$$

B. Rerouting and Call Gapping in the Peripheral Network Domain

Figure 4A:
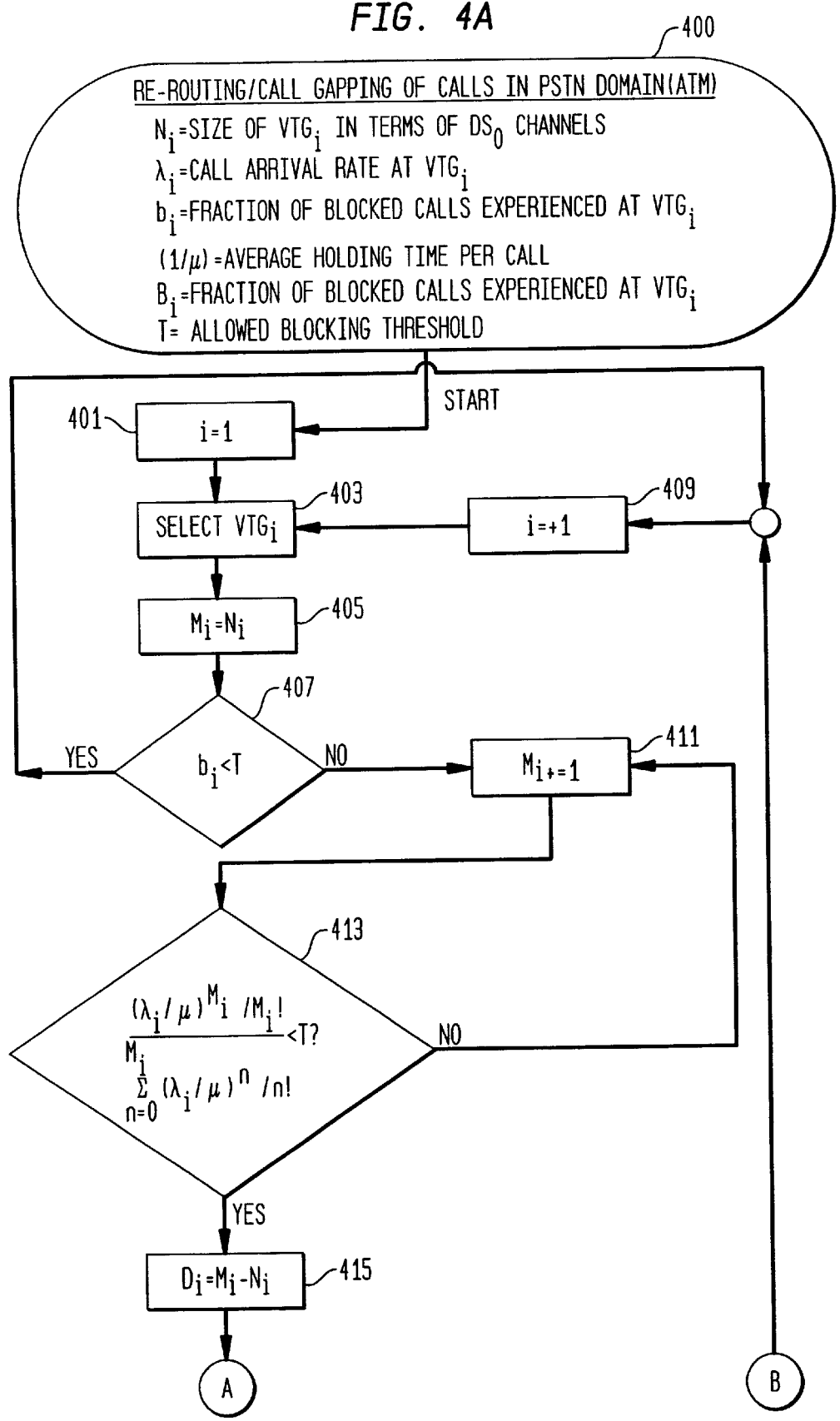
FIGS. 4A, 4B, and 4C comprise a flow diagram illustrating an embodiment of the invention specifically adapted to an ATM network in which the network congestion management method and apparatus calculates information necessary for call gapping and rerouting calls in the PSTN domain of peripheral networks to relieve congestion, generates proposed actions to implement the call gapping and rerouting and forwards the proposed action information to the network gateway nodes for forwarding to the PSTN networks for execution.
Figure 4B:
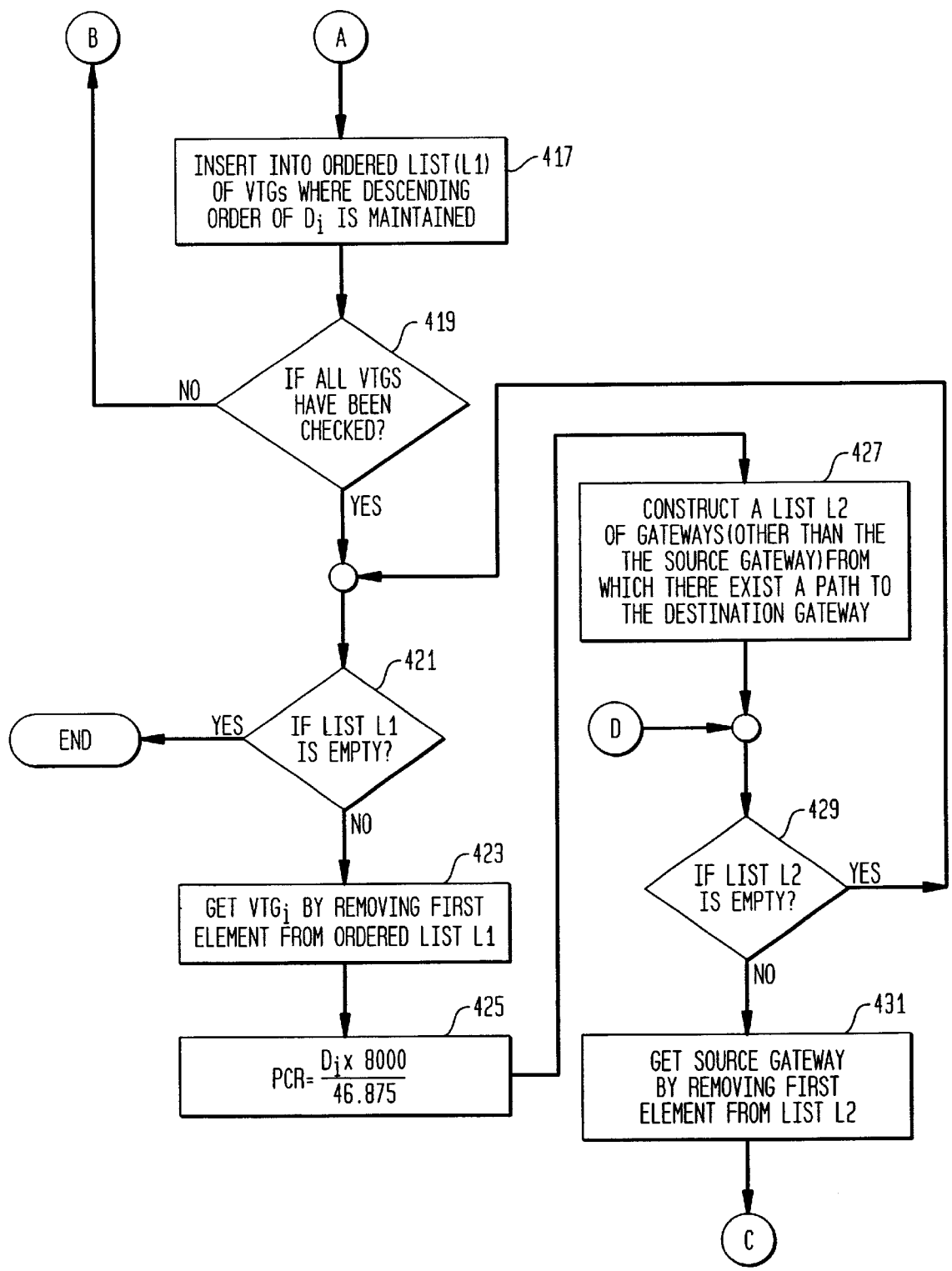
Figure 4C:
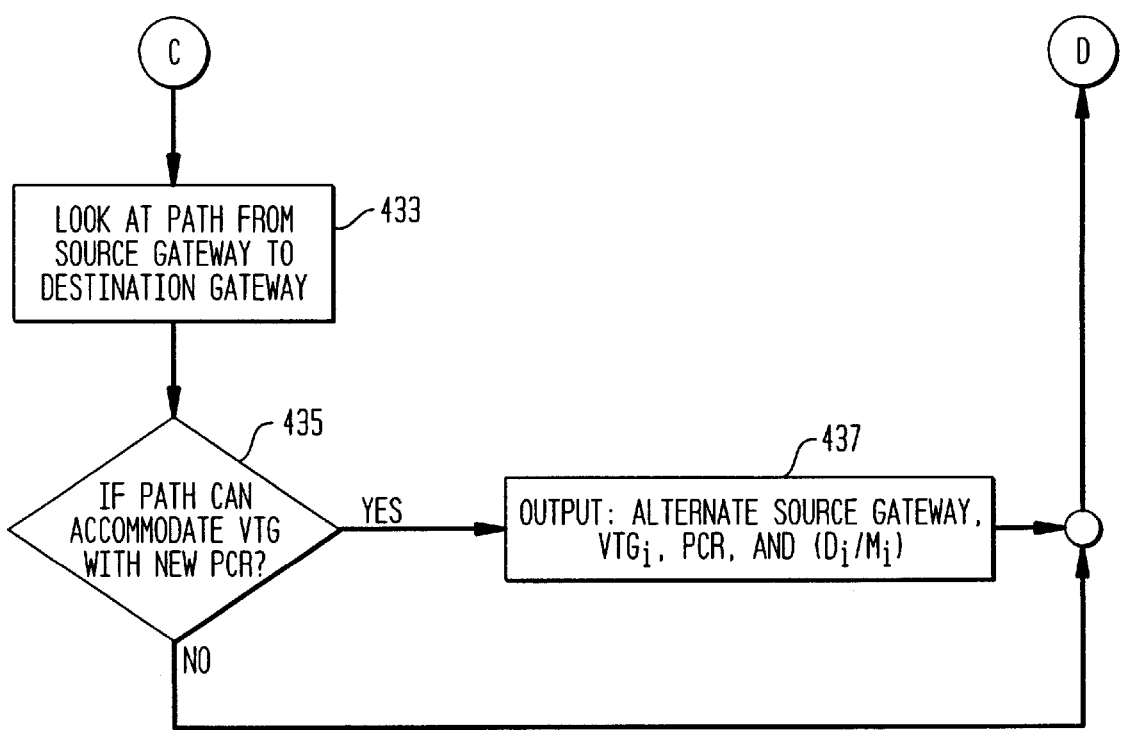

FIG. 4 comprises, 4A, 4B, and 4C and is a flow diagram illustrating a second embodiment of the invention in which network congestion is relieved via the mechanisms of rerouting calls and call gapping in the PSTN domain of the peripheral networks that communicate with each other via the central packet network. Rerouting and call gapping are separate and distinct congestion control mechanisms. However, since the NCM merely generates the information needed to carry out the congestion relief mechanism, while the actual mechanisms are carried out by the peripheral networks. Thus, as will become clear from the discussion below, the steps of the NCM process in the central, packet, network are the same for both of the peripheral domain congestion relief mechanisms (rerouting and call gapping). The difference in operation between re-routing and call gapping occurs in the peripheral domain (i.e., what the peripheral networks do with the provided information. They may be utilized entirely separately from each other or in conjunction with each other and/or any of the other congestion control mechanisms discussed herein. For instance, the rerouting in the PSTN domain illustrated by FIG. 4 can be utilized as a secondary network congestion relief mechanism if virtual trunk group resizing (FIG. 3) does not yield the necessary congestion relief, e.g., does not bring the amount of call blocking, $b_i$, below the call blocking threshold T. Rerouting and call gapping are illustrated in conjunction with each other in FIG. 4 simply because much of the processing for both mechanisms is similar. FIG. 4 illustrates a level-1 embodiment in which the information is collected and congestion relief mechanisms are identified for execution by other network elements. The corresponding level-0 embodiment should be apparent therefrom.

Generally, there would not be a corresponding level-2 embodiment (in which the NCM carries out the congestion control mechanisms) because these congestion control mechanisms are PSTN domain mechanisms which must be executed in the PSTN networks in any event.

Call gapping requires the ability to recognize the traffic sources feeding into a VTG, e.g., the relevant PSTN switches. In practice, there also may be multiple PSTN switches feeding into a given VTG. In this case, the VTG must be able to segregate the aggregated call attempt rate into a VTG into its feeding components (i.e., the contributing PSTN switches). Such functionality is more likely to be incorporated into a call processing gateway with SS7 call control capability than in a media processing gateway such as an AC120/60.

Referring now to FIG. 4, variables are defined in block 400. The inputs are the fraction of blocked calls per VTG (b), the call arrival rate per VTG ($\lambda$), the bandwidth per call, the number of channels per VTG (N), the blocking threshold (T), the average holding time per call ($1/\mu$), the network connectivity and topological information.

In step 401, variable i is set to 1. Variable i is used to designate the particular VTG of the network being processed. In step 403, a VTG corresponding to i is selected. In step 405, a variable $M_i$ is set to the size, $N_i$, of the selected VTG. The size is designated in terms of the number of DS0 channels in the VTG. In step 407, it is determined whether the fraction of blocked calls for VTG$_i$ is less than the threshold, i.e., if b$_i$<T. If it is, then no congestion management actions are necessary with respect to the present VTG and, therefore i is incremented to select the next VTG (step 409) and flow returns to step 403 to process the next VTG.

If, however, the call blocking being experienced exceeds the threshold, T, flow proceeds to step 411where M is incremented by one. In steps 411 and 413, channel capacity variable M$_i$ is adjusted using equations 1a, 1b, 2a, and 2b as described above in connection with FIG. 3 until the necessary channel capacity to bring the call blocking rate, b$_i$, below the call blocking threshold, T, is determined. In step 415, a value D$_i$ is determined which is the difference between the present size of the VTG and the size of that VTG needed to bring the call blocking probability number below the predetermined call blocking threshold (as calculated in steps 411–413).

In step 417, the VTG is inserted into an ordered list, L1, of VTGs that are exceeding the call blocking threshold. The list is ordered such that the VTG corresponding to the highest value for D$_i$ is listed first and the VTG corresponding to the lowest value of D$_i$ is listed last. Flow then proceeds to step 419 to determine if all VTGs have been checked. If not, i is incremented (step 409) and flow returns to step 403 for processing of the next VTG.

When all VTGs have been checked, flow proceeds from step 419 to decision step 421. In step 421, if list L1 is empty (i.e., if no VTGs are overly congested), then the operation ends since no congestion relief operations are necessary. However, if list L1 is not empty, flow proceeds to step 423.

In step 423, the first VTG is removed from list L1 for processing. In step 425, a peak cell rate for the desired size of that VTG is calculated using equation (4). Then, in step 427, a list L2 is created of gateway nodes (other than the source node of the current VTG) from which there exists a path to the destination gateway node of the current VTG. Next, decision step 429 determines if list L2 is empty. If so, then flow returns to step 421 for processing of the next VTG on list L1, if any.

If list L2 is not empty, i.e., if there are alternate source gateways from which calls from the relevant peripheral network can be routed to the destination gateway node, then the first potential source gateway on list L2 is removed from the list (step 431). In step 433, the path from that gateway to the destination gateway of the current VTG is examined to determine its PCR using equation (4). In decision step 435, if the path can accommodate a VTG having the PCR calculated in step 425, flow proceeds to step 437 where the necessary information, including the identity of the alternate source gateway node, the identity of VTG$_i$, the PCR of the new path and the fraction of calls from VTG$_i$ that should be rerouted in the PSTN domain (D$_i$/M$_i$) is forwarded to the PSTN network for implementation. That PSTN network should then reroute the fraction D$_i$/M$_i$ of calls through the identified alternate source gateway and/or institute call gapping based on the fraction D$_i$/M$_i$. As discussed above, how this data is used by the peripheral network will differ depending on whether it will perform call gapping or rerouting. For instance, if the peripheral network performs only, but no rerouting, then the alternate gateway information is not used by the peripheral network.

C. Voice Compression

Figure 5B:
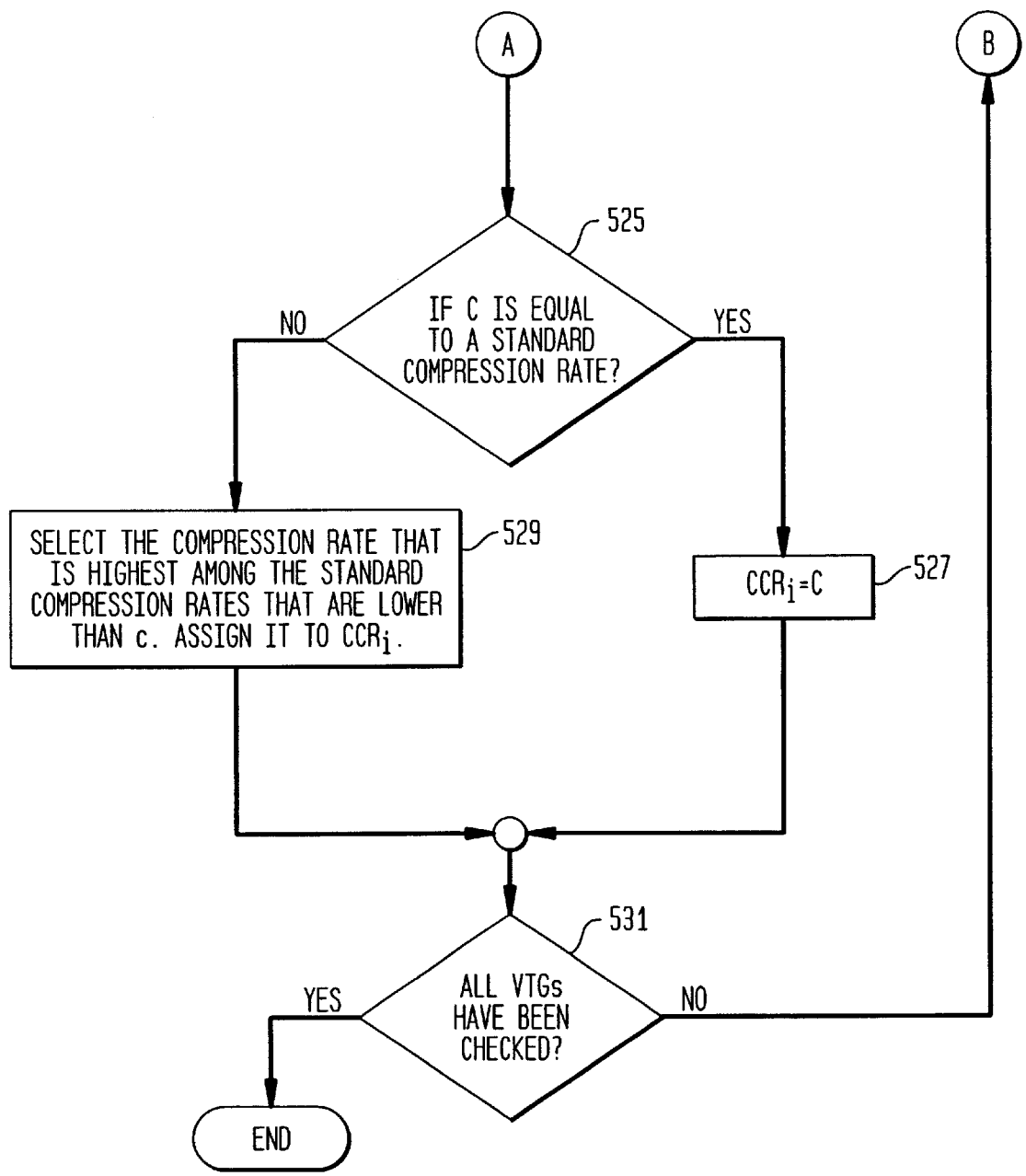

FIG. 5 illustrates an ATM embodiment of the invention in which voice compression is utilized as a congestion relief mechanism. As with each of the previously discussed congestion relief mechanisms, this mechanism may be used independently and separately from any of the others. Alternately, it may be used as just one of many relief mechanisms. FIG. 5 comprises portions 5A and 5B and, for illustrative purposes, is a level-0 embodiment in which the data is merely collected.

Variables are defined in block 500. The inputs are the fraction of blocked calls per VTG (b), the call arrival rate per VTG (λ), the number of channels per VTG (N), the blocking threshold (T), the average holding time per call (1/μ), the current compression rate (CCR), and network connectivity and topological information.

In step 501, variable i is set to 1. Variable i designates the particular VTG of the network. In step 503, VTG$_i$ is selected. In step 505, variable M$_i$ is set to the actual size, N$_i$, of the selected VTG. In step 507, it is determined whether the fraction of blocked calls for VTG$_1$ exceeds the threshold, i.e., if b$_i$>T. If the current VTG is experiencing less call blocking than the threshold level, then, in steps 508, 509, 511 and 515, a size, N$_i$, is calculated for this VTG that is the minimum size needed to keep the call blocking probability b$_i$ below the blocking threshold, T. (These steps are essentially identical to steps 308, 309, 311 and 315 from FIG. 3).

If the blocking rate exceeds the threshold, then flow proceeds from step 507 to step 517. Steps 517–521 are similar to steps 508–515, except that the VTG size is being increased, rather than decreased. Specifically, in step 517, the non-stationary call blocking probability for a VTG of size M$_i$ is calculated using equations 1a, 1b, 2a and 2b. In step 519, it is determined if the calculated probability is less than the predetermined call blocking threshold. If not, then M is incremented by one (step 521) and steps 517 and 519 are repeated. The process flows through steps 521, 517 and 519 until M$_i$ yields a blocking rate that is less than the blocking threshold T.

Regardless of whether the particular VTG under consideration is overly congested (i.e., processed through steps 517–521) or not (i.e., processed through steps 508–515), in step 523, a voice compression rate is calculated for each VTG based on the VTG size M$_i$ determined in steps 508–515 of 517–521. The compression rate can be computed as:

$$\text{compression rate} = \frac{CCRi \times Ni}{Mi} \text{Kbps}, \quad \text{Eq. (5)}$$

where CCR$_i$ is the current compression rate, N$_i$ is the actual present size of the VTG, and M$_i$ is the ideal VTG size just determined.

In decision step 525, it is determined whether the compression rate calculated in step 523 is equal to a standard compression rate. If so, that compression rate is assigned (step 527). If not, then the highest standard compression rate that is less than the compression rate calculated in step 523 is selected (step 529). In decision step 531, it is determined whether all VTGs have been processed. If not, i is incremented to select the next VTG (step 533) and flow returns to step 503 to process the next VTG. If so, then the procedure ends.

In short, in the embodiment illustrated in FIG. 5, regardless of whether or not a VTG is overly congested, it is assigned a compression rate, if any, that is the lowest compression rate that will keep the call blocking probability below the predetermined call blocking threshold. Thus, for instance, as can be seen from the flow diagram, steps 508–515 and 523–529 assure that, when traffic for a VTG decreases, the voice compression ratio is reduced or eliminated accordingly. Likewise, as traffic increases, voice compression ratio is implemented (or increased).

The compression rate will be applied only to calls initiated after it is decided to use voice compression. The compression rate (or lack thereof) cannot be changed in the middle of a call. Accordingly, this solution will take some period of time to yield results.

The corresponding level-1 embodiment would include an additional step of forwarding the voice compression rate determined in step 527 or 529 to the relevant source nodes for implementation. With respect to voice compression as the congestion relief mechanism, it would not be practical to develop a level-2 embodiment, since, in any event, the compression would be implemented at the source gateway nodes.

In general, since all VTGs may not have the same quality of service objective, this embodiment may be further modified in order to refine the above described procedures on a per quality of service class basis.

D. Conclusions About ATM Networks

It is believed that one of the most effective combinations of the four above-discussed traffic congestion relief mechanisms for an ATM network is a combination of all four mechanisms in the following hierarchy: (1) virtual trunk group reconfiguration, (2) rerouting of calls in the PSTN domain, (3) voice compression, (4) PSTN call gapping.

IV. IP Network Congestion Management Embodiments

Having considered several embodiments of the invention particularly adapted for ATM packet networks, let us now turn to further potential embodiments of the invention particularly adapted for IP networks. As noted above, IP networks generally have much less available congestion information. What we believe to be the most effective traffic control mechanisms with respect to IP networks in order from most desirable to least desirable are call blocking, voice compression, rerouting of calls in the PSTN domain and PSTN domain call gapping.

In the present specification, congestion control mechanisms for IP networks are classified into two classes. One class is independent of the real time protocol (RTP) measurements as set forth in "Real-Time Transport Protocol Management Information Base." <draft-ietf-avt-etp-mib.txt>. The other class is based on RTP measurements in accordance with the RTP/RTCP protocol suite for data transport and the ITU-T H.323v2 protocol suite for call signaling and control. Embodiments using RTP measurements are preferable because of the availability of accurate packet loss and delay measurements. However, at the present time, RTP MIB modules are still in the draft stage and most Packet/Voice Gateways (PVGs) have not implemented them yet.

In IP networks, calls are typically admitted into the network without any admission control. Where admission control is applied, the congestion control procedures proposed above for ATM networks would be applicable.

In IP networks, when the network becomes congested, each call passing through the congested portion of the network starts to experience higher packet losses and delays and, consequently, poorer quality. We shall consider the goal to be to reduce the possibility that active calls experience an unacceptable level of performance (via packet losses and delays).

In networks utilizing RTP MIBs, call quality information is available in terms of packet loss and delay jitter per call. However, even in the absence of RTP MIBs, this information may be inferred with varying degrees of accuracy by collecting available measurements such as port utilization, buffer statistics and routing and topological information. After collecting the call quality information either through the packet loss and delay jitter per call data or as inferred through port utilization, buffer statistics and routing and topological information, the network control manager (NCM) in accordance with the present invention determines source-destination pairs (PVG pairs) whose calls are experiencing poor quality. The network administrator has predetermined acceptable packet loss and delay jitter per call thresholds. When performance drops below those thresholds for any source-destination pair, congestion control mechanisms are commenced.

In a preferred embodiment, the network congestion manager first tries to block new call arrivals that can further deteriorate the quality of call performance of existing calls. As a secondary measure, the NCM can apply higher voice compression to new calls while maintaining the level of voice quality of existing calls so as to improve the quality of the existing uncompressed calls and/or to allow more calls (less call blocking). Third, the NCM can try to reduce the number of active calls through that source-destination pair by having calls rerouted in the PSTN domain. Finally, if none of those measures produce adequate results, the NCM can invoke call gapping functionality in the PSTN domain.

Let us now consider a few particular embodiments of the invention implementing each of the above-discussed types of congestion control mechanisms.

A. Call Blocking

Figure 6B:
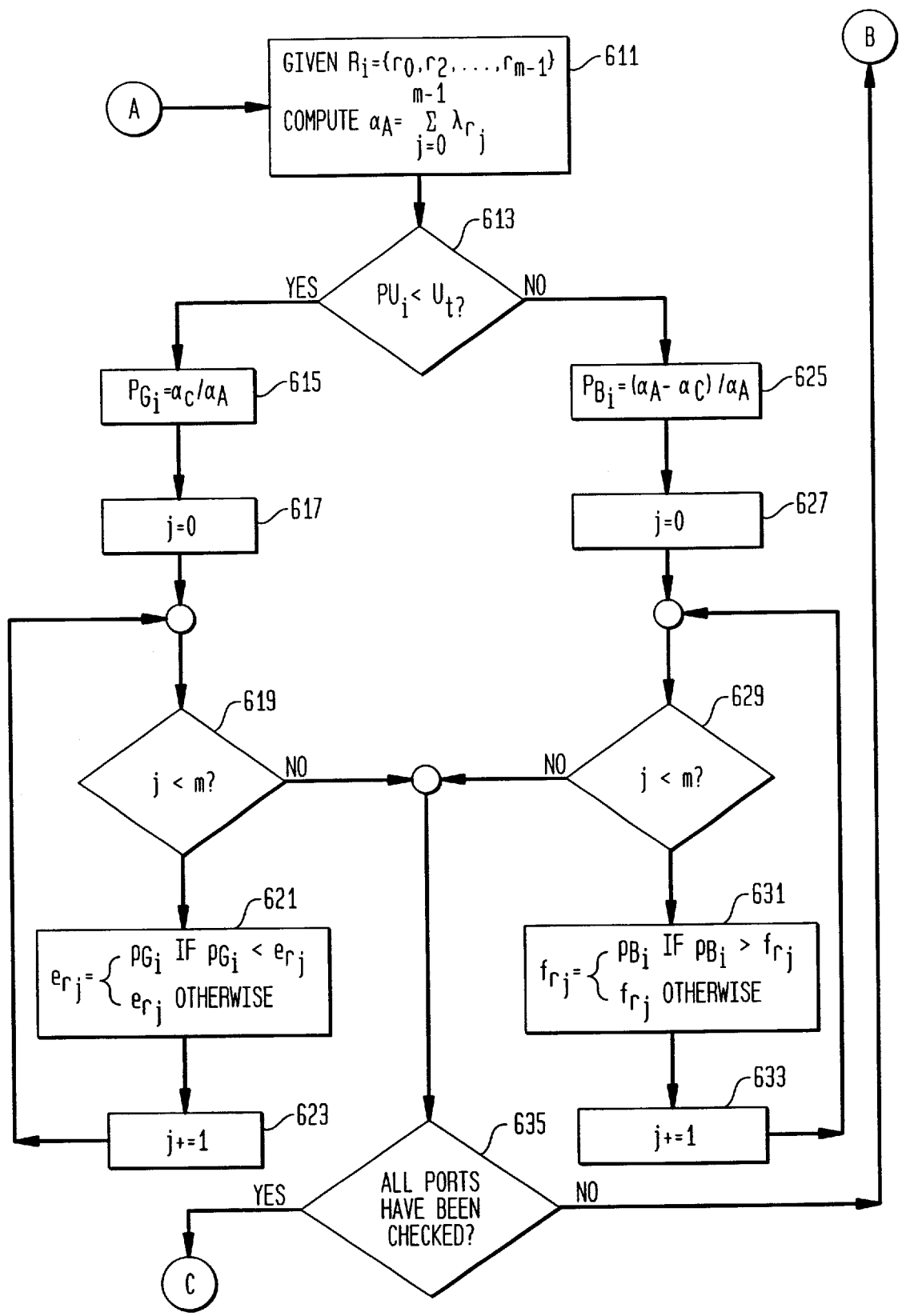
Figure 6C:
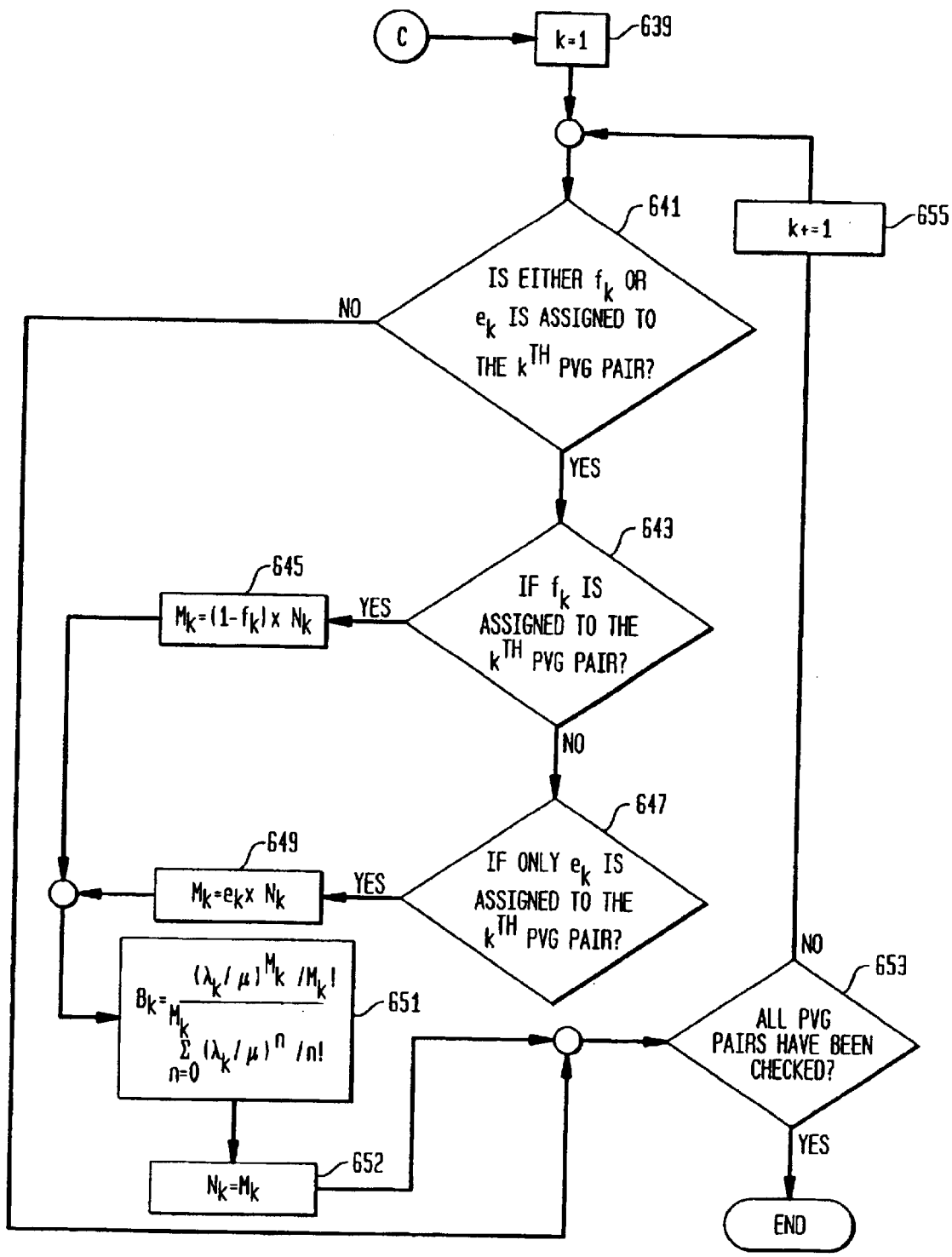
Figure 7A:
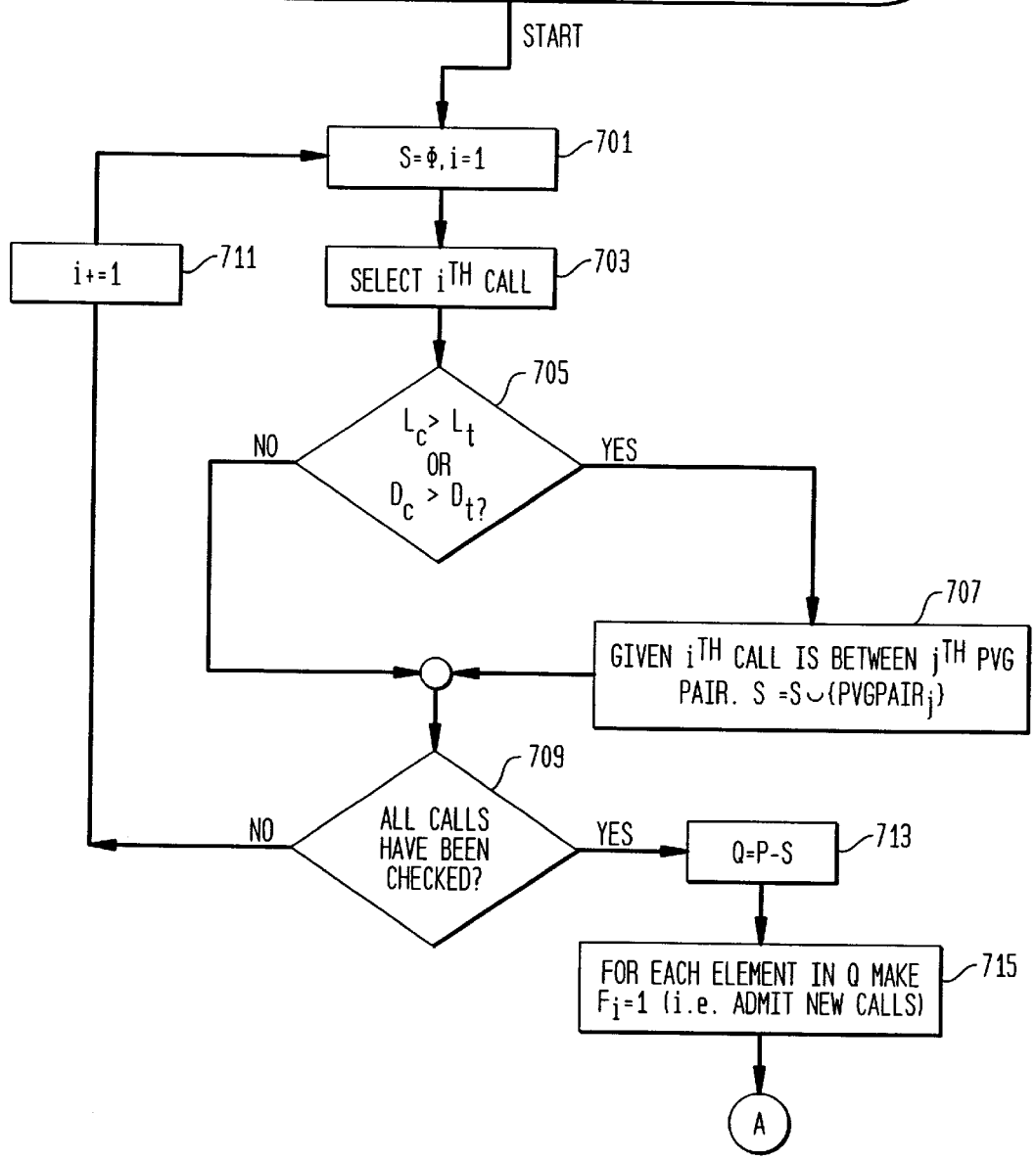
FIGS. 7A and 7B comprise a flow diagram illustrating an embodiment of the invention specifically adapted for IP networks on which the real-time protocol is implemented which identifies gateway pairs experiencing excessive congestion in the IP network and generates the necessary call blocking rate as a fraction of arriving calls for the identified gateway pairs in order to relieve the congestion.
Figure 7B:
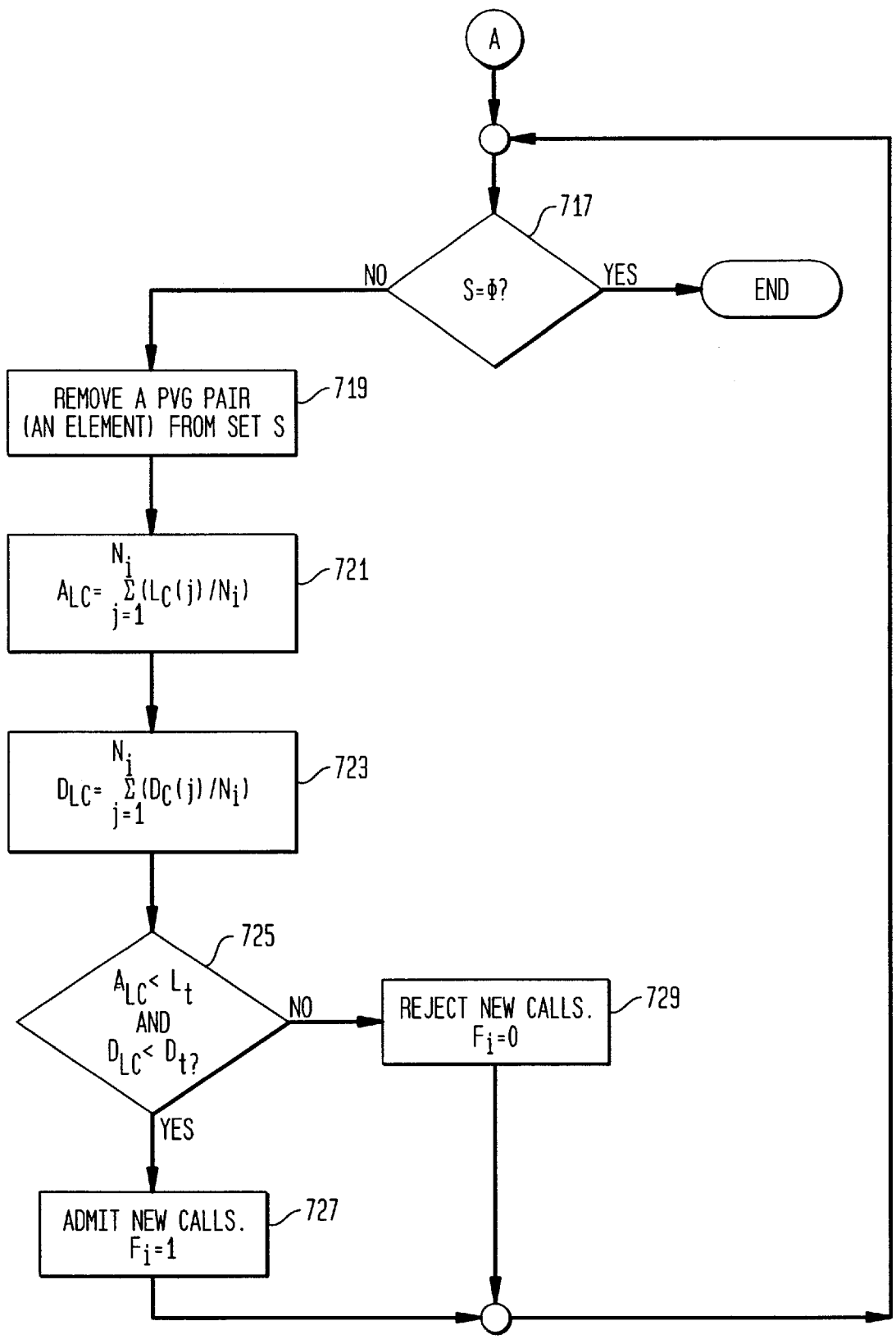

FIGS. 6 and 7 are flow diagrams illustrating two embodiments utilizing call blocking as the network congestion control mechanism. FIG. 6 comprises portions 6A, 6B and 6C and illustrates an embodiment particularly adapted for an IP network where RTP measurements are unavailable. FIG. 7 comprises portions 7A and 7B and illustrates an embodiment particularly adapted for IP networks in which RTP measurements are available. In these embodiments, the NCM determines, through the available measurements, what source-destination pairs are beginning to experience poor performance (as defined by threshold set by the network administrator). When these pairs are identified, the NCM instructs blocking of a certain fraction of new arriving calls in order to maintain the quality of existing calls.

Referring first to the RTP unaware embodiment of FIG. 6, variables are defined in block 600. The input data are port utilizations (PU), routing information and topological information. In step 601, variable i, which is used to represent the different ports of the network is set to 1. In step 603, the $i^{th}$ port is selected. In step 605, the set $R_i$ of PVG pairs contributing traffic to the presently selected port is determined from the available topological and routing information. In step 607, the number of calls, C, that can be accommodated at that port is determined by multiplying the physical capacity of the port by a utilization threshold selected by the network administrator. The utilization threshold, $U_i$, is a fraction (for instance, 0.8) of the physical capacity of the port that the administrator finds acceptable. In step 609, the number of calls per second, $\alpha_C$, that can be accommodated at that port based on the calculated value C (and other information) is determined by solving equation 1a for $\alpha_C$. In step 611, the calls per second that are presently passing through that port, $\alpha_A$, is determined by summing the calls per second through each of the PVG pairs contributing to the traffic at that port.

In decision step 613, the under-utilized ports are segregated from the over-utilized ports. The under-utilized ports are processed through steps 615–623, while the over-utilized ports are processed through steps 625–633. For purposes of the following discussion, it is important to bear in mind the distinction between ports and PVG pairs that contribute traffic to the ports.

The processing through the two routes is very similar in that a bandwidth correction factor (either an incremental factor, $p_G$, if the present utilization is less than the threshold, or a reduction factor, $p_B$, if the present utilization is greater than the threshold) is determined for each PVG pair in set R for the present (i.e., the $i^{th}$) port. Specifically, in step 615 (or 625), a bandwidth incremental (or reduction) factor is calculated for the $i^{th}$ port. With respect to the reduction factor $p_B$ (step 625), this value represents the fraction of calls through the $i^{th}$ port that need to be blocked to meet the utilization thresholds set by the administrator. With respect to the incremental factor $p_G$ (step 615), this value represents the fraction of calls that can be added through the $i^{th}$ port without inducing a need to implement call blocking.

Then, in steps 627–633, a bandwidth reduction factor, f, for each PVG pair contributing traffic to the $i^{th}$ port is assigned by taking the largest of the reduction factors $p_B$ of all of the overly congested ports to which each PVG pair in list R contributes. In other words, if the traffic between a given PVG pair passes through m ports, it is assigned a bandwidth reduction factor of max $(p_{B,1}, p_{B,2}, p_{B,3}, p_{B,4}, \ldots p_{B,m})$ Likewise, in steps 617–623, a bandwidth incremental factor, e, for each PVG pair contributing traffic to the $i^{th}$ port is assigned by taking the smallest of the incremental factors $p_G$ of all of the under utilized ports to which each PVG pair contributes. In other words, if the traffic between a given PVG pair passes through m under utilized ports, it is assigned a bandwidth incremental factor of min $(p_{G,1}, p_{G,2}, p_{G,3}, p_{G,4}, \ldots p_{G,m})$ Steps 617–623 and 627–633 are included because any given PVG pair may be processed through steps 613–633 more than once because steps 613–633 will be traversed for every port in the network and any given PVG pair may be contributing traffic to more than one port in the network.

After all of the PVG pairs contributing traffic to port i have been processed, flow proceeds to step 635, where it is determined if all of the ports have been processed. If not, flow proceeds to step 637, where i is incremented, and the next port is processed in accordance with steps 603–633.

When all ports have been so processed, flow instead proceeds from step 635 to step 639, where variable k is set to one. Variable k is used to represent PVG pairs.

Another result of the fact that any given PVG pair could be contributing traffic to more than one port is that it is possible that the same PVG pair might have been assigned a value for both e and f in steps 621 and 631, respectively. It also is possible that any given PVG pair may not have been contributing traffic to any of the ports. Thus, in step 641, it is first determined if the PVG pair was assigned either an e or a f value. If not, processing flows directly to decision step 653 where the procedure either ends (if all PVG pairs have been processed) or k is incremented (step 655) and flow returns to step 641 for processing of the next PVG pair.

However, if, in step 641, either a f or e value was assigned, flow proceeds to decision step 643, where it is first inquired whether this particular PVG pair was assigned a bandwidth reduction value, f, i.e., if it is over utilized. If so, then, in step 645, a new, decreased, call capacity value, $M_k$, is assigned for that pair by multiplying the number of calls for which bandwidth is allocated to that pair, $N_k$, by the bandwidth reduction factor f assigned to that PVG pair in step 631. Any bandwidth incremental factor, e, that may have been assigned to that PVG pair (in step 621) is ignored if a bandwidth reduction factor, f, was assigned to that pair since, if any port to which that PVG pair was contributing traffic was over utilized, call blocking should be increased, not decreased, for that PVG pair.

If, on the other hand, no bandwidth reduction factor, f, was assigned to that PVG pair in connection with any port, then, in step 647, it is determined if a bandwidth incremental factor, e, was assigned. Step 647 is provided for illustrative purposes. However, in reality, it is a superfluous processing step since, in order for flow to reach step 647, the condition expressed in step 647 already must be true. Thus, flow will proceed to step 649. In step 649, a new, increased, call capacity, $M_k$, is assigned for that pair by multiplying the number of calls for which bandwidth is allocated to that pair by the bandwidth incremental factor, e, determined for that pair.

In either event, flow proceeds to step 651, where a new call blocking probability is calculated and assigned by using the newly calculated call capacity, $M_k$, determined in step 645 or 649 in equation 1a.

In step 653, if all PVG pairs have been checked, the procedure ends. Otherwise, variable k is incremented (step 655) and flow returns to step 641 for processing of the next PVG pair.

FIG. 6 illustrates a level-0 implementation. Level-1 and level-2 implementations would include further steps for implementing the indicated call blocking rates, either directly or through other network elements.

FIG. 7 is a flowchart comprising portions 7A and 7B and illustrating processing for call blocking in an IP network in which RTP measurements are available. Variables are defined in block 700. The inputs in this embodiment are the fraction of packet loss per call ($L_C$), the packet loss threshold established by the network administrator ($L_t$), the delay jitter per call ($D_C$), the delay jitter per call threshold established by the network administrator ($D_t$) and the PVG pair corresponding to each call.

In step 701, variables S and i are reset. Variable i represents a particular active call, variable S represents a set of PVG pairs between which there are calls experiencing delay jitter and/or packet loss in excess of the thresholds set by the administrator (to be explained further below). Variable i is reset to 1 and set S is reset to null. In step 703, the $i^{th}$ call is selected. In step 705, it is determined whether the call is experiencing inadequate performance by comparing its packet loss and delay jitter statistics (as maintained in the RTP protocol) with the performance thresholds set by the system administrator. If either threshold is not being met, then flow proceeds to step 707, where the PVG pair is added to set S. If both performance specifications are being met, then flow skips step 707 and proceeds directly to step 709, where it is determined if all of the calls have been evaluated. If not, then i is incremented (step 711) and flow proceeds through steps 701–709 again for the next active call.

When all active calls for all PVG pairs in the network have been evaluated, flow proceeds from step 711 to step 713. In step 713, a variable Q is defined as the set of PVG pairs in the network whose calls are experiencing acceptable performance ($L_C$ and $L_T$ are below the predetermined thresholds) In step 715, each PVG pair identified as experiencing acceptable performance, has a flag set that indicates that new calls can be admitted.

In step 717, if no PVG pairs have been added to set S in step 707, the program terminates since all calls are experiencing adequate performance. If there are any calls in set S, then flow instead proceeds to step 719, in which a PVG pair in set S is selected. In step 721, an average packet loss across all calls using the particular PVG pair, $A_{LC}$, is determined.

In step 723, an average delay jitter across all calls using the particular PVG pair, $A_{LD}$, is determined. In step 725, it is determined if both the average delay jitter and the average packet loss for the PVG pair are within the corresponding, predetermined, thresholds. If so, then new calls are admitted (step 727). If not, then new calls are not admitted (step 729). Flow then proceeds back to step 717 for processing of the next PVG pair in set S until there are no PVG pairs remaining is set S.

Call Blocking Implementation Considerations

Neither RTP nor H.323 currently supports the concept of a virtual trunk group for an IP network. However, there is enough management information in MIBs operating under the RTP or H.323 standard to logically define a virtual trunk group. This logic definition would require correlation of MIB data that is maintained in different devices, such as source and destination PVGs. A network congestion manager could be provided in accordance with the present invention that would perform the correlation of this data and define virtual trunk groups for IP networks. In this manner, the reconfiguration of virtual trunk groups described above with respect to ATM networks could also be implemented with respect to IP networks.

Since call rejection decisions are made after the fact, that is, after the packet loss exceeds the packet loss threshold, the system administrator should set the packet loss threshold below the actual desired packet loss objective. Further, it is advisable to collect call blocking statistics for purposes of long term traffic engineering, e.g., determining what resources are necessary for the network and how they should be allocated.

Rerouting and Call Gapping in the PSTN Domain

Figure 8B:
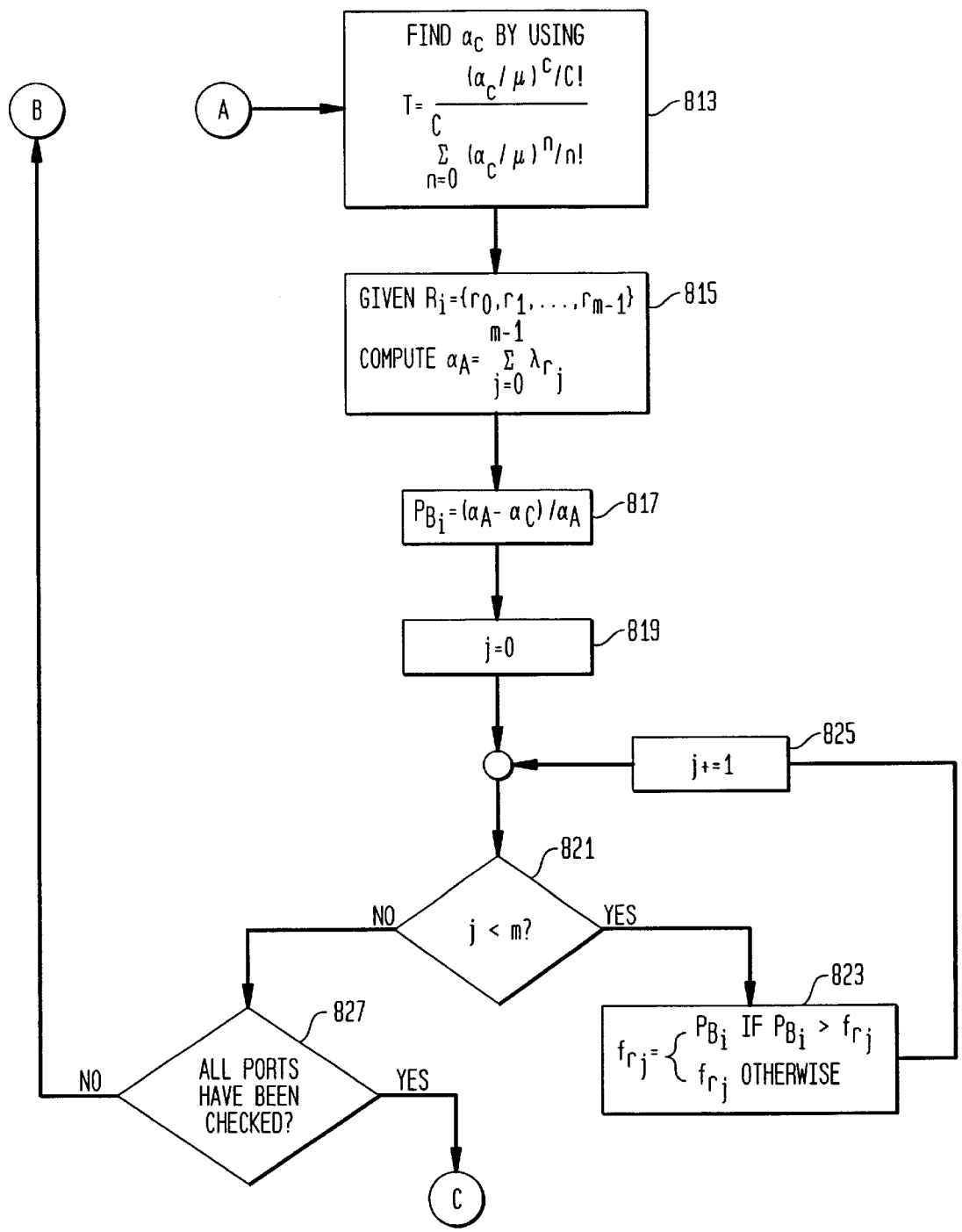
Figure 8C:
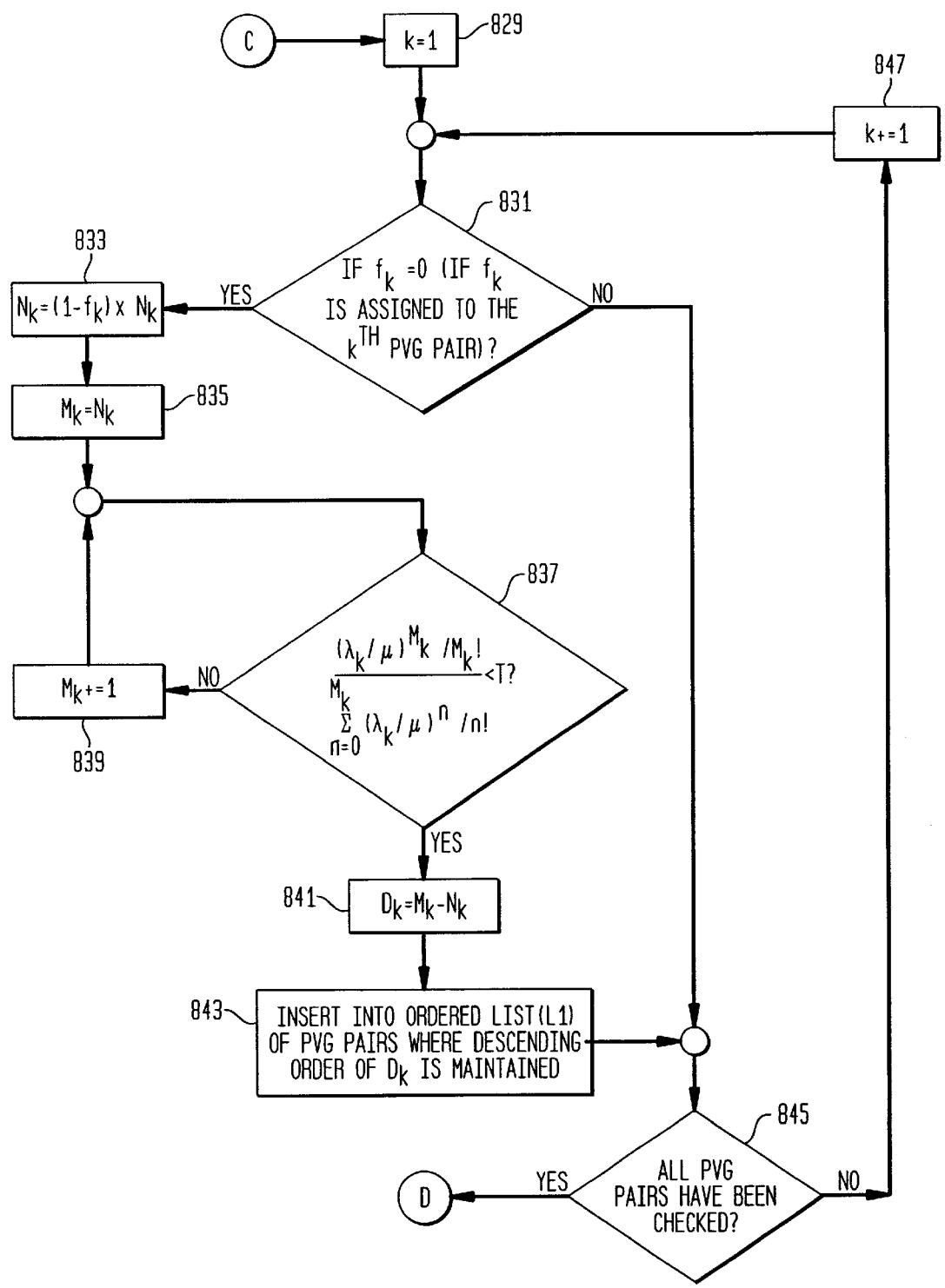
Figure 8D:
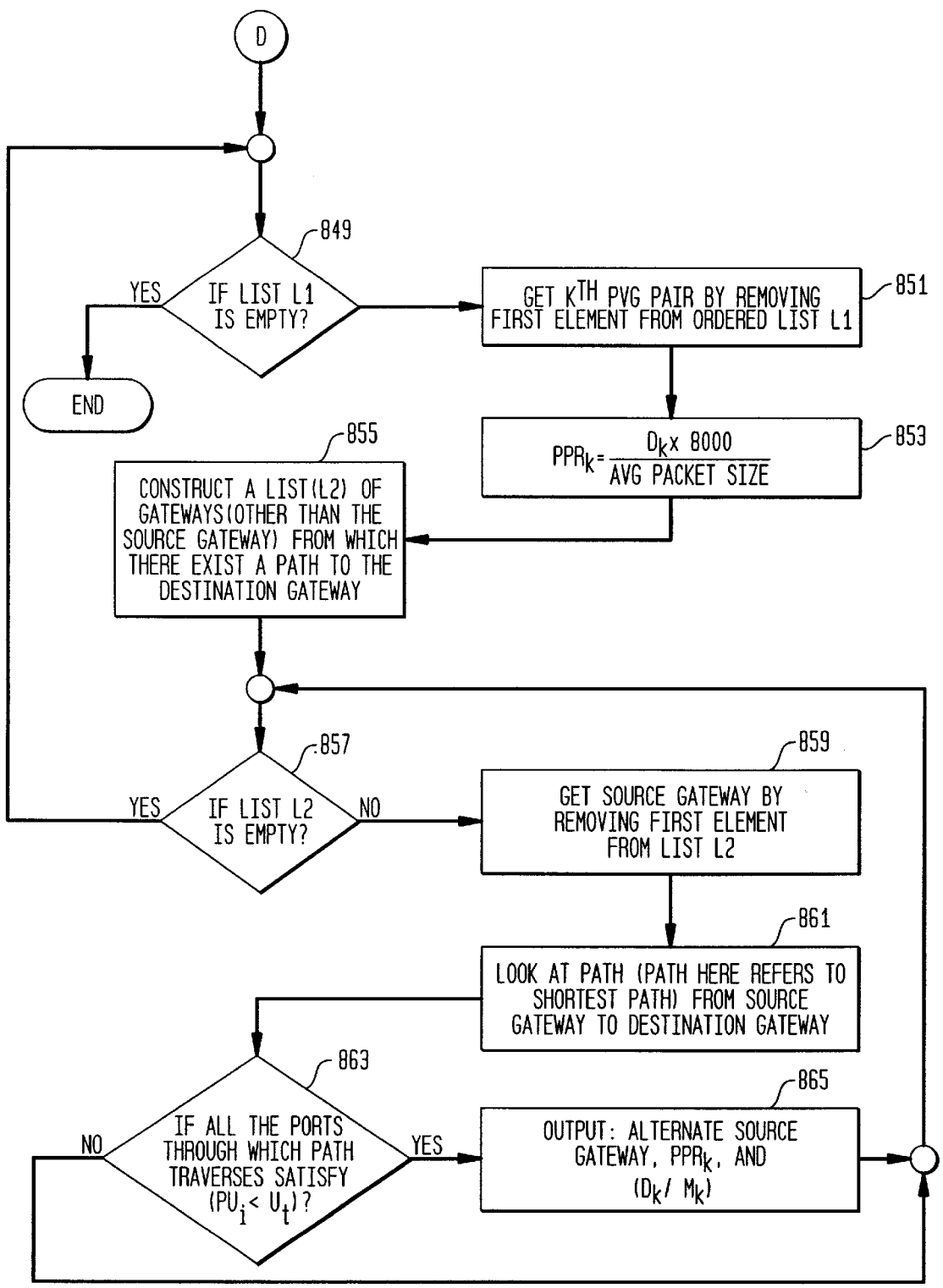

FIG. 8 includes portions 8A, 8B, 8C and 8D and comprises a flow diagram illustrating both rerouting and call gapping in the PSTN domain. As with all other congestion control mechanisms discussed heretofore, rerouting in the PSTN domain and call gapping in the PSTN domain also can be used individually or in combination with each other or any of the other congestion control mechanisms discussed in this specification. However, since much of the processing for both mechanisms is the same, both mechanisms are incorporated in this figure.

As discussed above in connection with FIG. 4, a single flow chart can be used to illustrate rerouting and call gapping because the congestion relief is performed in the peripheral domain. Thus, the differences in processing are in the peripheral domain and, therefore, do not manifest themselves in the NCM flowchart of FIG. 8, which illustrates only the processing in the central, packet-based, network.

Also, there is little useful information with respect to the call gapping and rerouting provided in the RTP protocol. Accordingly, there are no significant differences between RTP aware and RTP unaware embodiments. Thus, FIG. 8 generically applies to both RPT aware and RPT unaware embodiments of the invention.

Variables are defined in block 800. In step 801, variable i, which represents a port of the network, is set to 1. In step 803, the $i^{th}$ port is selected. In decision step 805, the under-utilized ports are segregated from the over-utilized ports. In a RTP aware embodiment, this decision would be based on delay jitter and packet loss statistics as discussed above in connection with step 705 in FIG. 7. In a RTP unaware embodiment, it would be based on indirect indicators of congestion such as port utilizations, buffer statistics and routing and topological information. If the present port is under-utilized, nothing is done with respect to it and i is simply incremented (step 807) and flow returns to step 803 for processing of the next port. If the port, however, is being over utilized, then flow proceeds to step 809, in which the set R of PVG pairs contributing traffic to the port is determined from the available topological and routing information. In step 811, the number of calls, C, that can be accommodated at that port is determined by multiplying the capacity of the port by a utilization threshold selected by the network administrator. The utilization threshold, U, is a fraction, for instance, 0.8, of the total physical capacity of that port that the administrator finds acceptable.

In step 813, the number of calls per second, $\alpha_C$, that can be accommodated at that port based on the calculated value C is determined by solving equation 1a for $\alpha_C$. In step 815, the actual calls per second that are presently passing through that port, $\alpha_A$, is determined by summing the calls per second through each of the PVG pairs contributing to the traffic at that port.

In steps 817, a preliminary bandwidth reduction correction factor, $p_B$, due to the $i^{th}$ port is determined. This value is the fractional difference between the actual call rate being experienced and the desired maximum call rate for the port. The larger this value, the more congested the port. Then, in steps 819, 823 and 825, for every PVG pair contributing traffic to port i, the bandwidth correction factor calculated for port i in step 817 is assigned to it, if and only if it is greater than any bandwidth correction factor previously assigned to that PVG pair.

By way of explanation, any given PVG pair may be contributing traffic to any port. Therefore, any PVG pair could have been assigned a bandwidth correction factor on a previous pass through steps 817–823 in connection with another port to which it is contributing traffic. Steps 817–823 guarantee that the highest bandwidth correction factor of any port to which any PVG pair is contributing traffic is assigned to that PVG pair.

When it is determined in step 821 that all PVG pairs in set $R_i$ (i.e., PVG pairs contributing traffic to the $i^{th}$ port) have been checked, i.e., j=m, flow proceeds to decision step 827. If there are ports that still remain to be checked, i is incremented (step 807) and flow returns to step 803 for processing of the next port.

When all of the ports have been checked, flow instead proceeds from step 827 to step 829, where k is set to 1. Variable k is used to represent the PVG pairs in the network.

In decision step 831, it is determined if a bandwidth correction factor has been assigned to the $k^{th}$ PVG pair. If so, flow proceeds to step 833 where an ideal channel capacity for the $k^{th}$ PVG pair is determined by multiplying the bandwidth correction factor, f, by the actual channel capacity, $N_i$, of the $i^{th}$ PVG pair.

In step 835, variable $M_i$ is set to $N_i$. In steps 837 and 839, the variable $M_i$ is adjusted using equations 1a, 1b, 2a, and/or 2b as described above in connection with FIG. 3 until the channel capacity necessary to bring the call blocking rate below the call blocking threshold, T, is determined. In step 841, a value $D_i$ is set to the difference between the channel capacity $N_i$ of the $k^{th}$ PVG pair as set in step 833 and the channel capacity value, $M_k$, determined in steps 837 and 839 necessary to bring the call blocking rate, $b_i$, below the call blocking threshold, T.

In step 843, the PVG pair is inserted into an ordered list, L1, of PVG pairs that are exceeding the call blocking threshold. The list is ordered such that the PVG pair corresponding to the highest value for $D_i$ (i.e., the most congested PVG pair) is listed first and the PVG pair corresponding to the lowest value of $D_i$ is listed last. Flow then proceeds to step 845 to determine if all PVG pair have been checked. If not, i is incremented (step 847) and flow returns to step 831 for processing of the next PVG pair.

When all PVG pairs have been checked, flow proceeds from step 845 to decision step 849. If list L1 is empty (i.e., if no PVG pairs remain in the list L1), then the operation ends since no further congestion relief operations are necessary. However, if list L1 is not empty, flow proceeds to step 851.

In step 851, the first PVG pair is removed from list L1 for processing. In step 853, a packet-rate, PPR, for the number of calls which it is desired to reroute ($D_k$) is calculated. Then, in step 855, a list L2 of gateway nodes, other than the source node of the current PVG pair, from which there exists a path to the destination gateway node of the current PVG pair is created from the network routing and topological information. Next, decision step 857 determines if list L2 is empty. If so, then flow returns to step 849 for processing of the next PVG pair in list L1, if any. If list L2 is not empty, i.e., if there are potential alternate source gateways from which calls from the peripheral network can be routed to the destination gateway node, then the first potential source gateway in list L2 is removed from the list (step 859). In step 861, the shortest path from that gateway to the destination gateway of the PVG pair under investigation is identified from the network routing and topological information. In decision step 863, it is determined if all the ports through which that path traverses are within the utilization threshold. If so, flow proceeds to step 865 where the necessary information, including the identity of the alternate source gateway node, the packet rate (PPR) which it is desired to reroute, and the fraction of calls between that PVG pair that should be rerouted (or to which call gapping should be applied) in order to bring the traffic through the PVG pair under consideration within the predetermined threshold ($D_k/M_k$) is forwarded to the PSTN network for implementation. The PSTN network should then reroute the fraction $D_k/M_k$ of calls through the identified alternate source gateway and/or institute call gapping based on $D_i/M_i$ and $PPR_i$.

In short, in the embodiment of FIG. 8, first, the congested ports are identified (steps 801–809). Then, the amount of traffic being contributed to that port by each PVG pair in the system is determined and the fractional amount of traffic contributed to that port by each PVG pair is quantified (steps 809–825). Next, the amount of traffic between each PVG pair which it is desired to reroute is determined (steps 829–843). Finally, the alternate gateways through which traffic may be routed is determined (steps 849–863).

Voice Compression Congestion Control

Figure 9B:
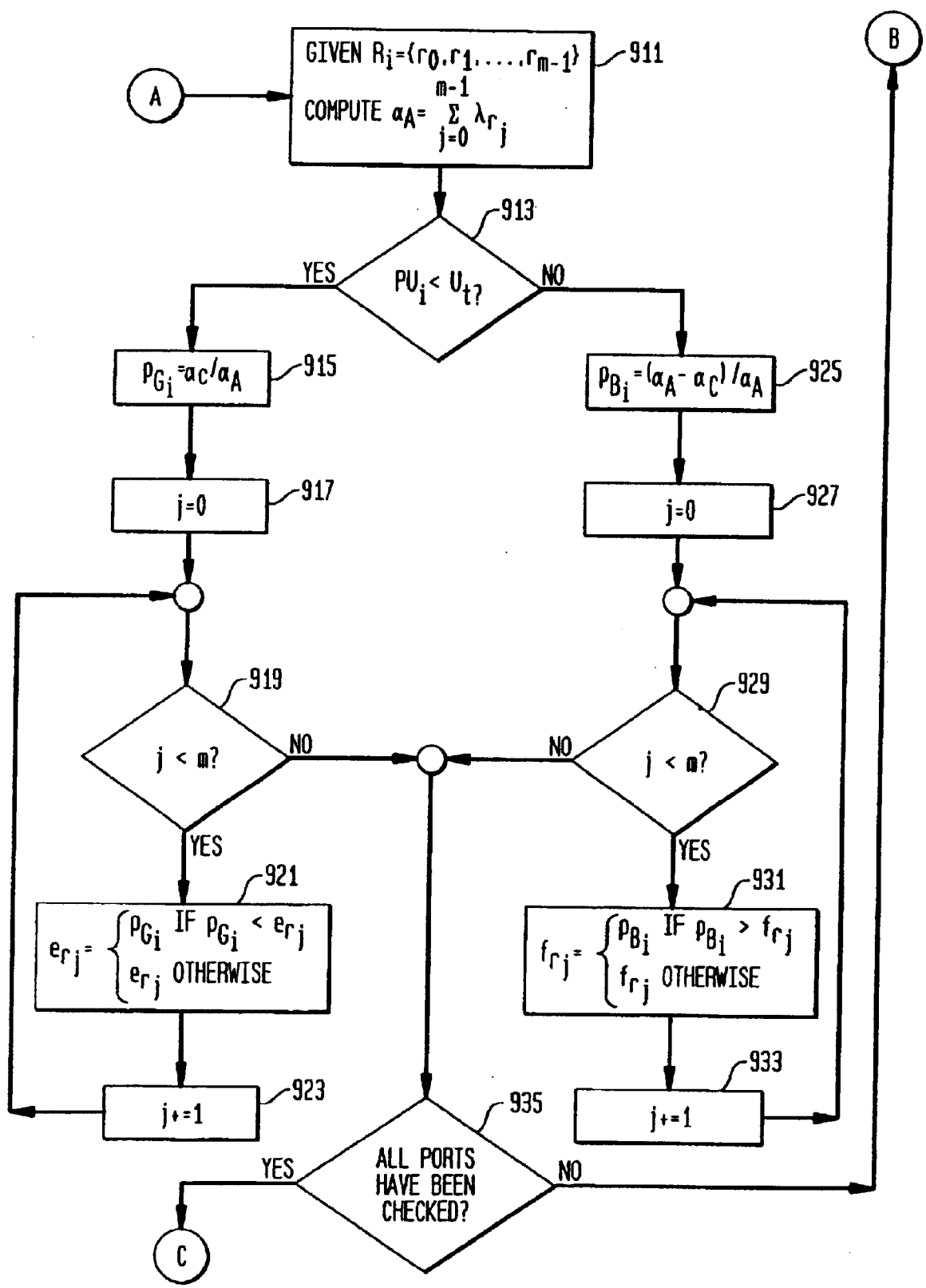
Figure 9C:
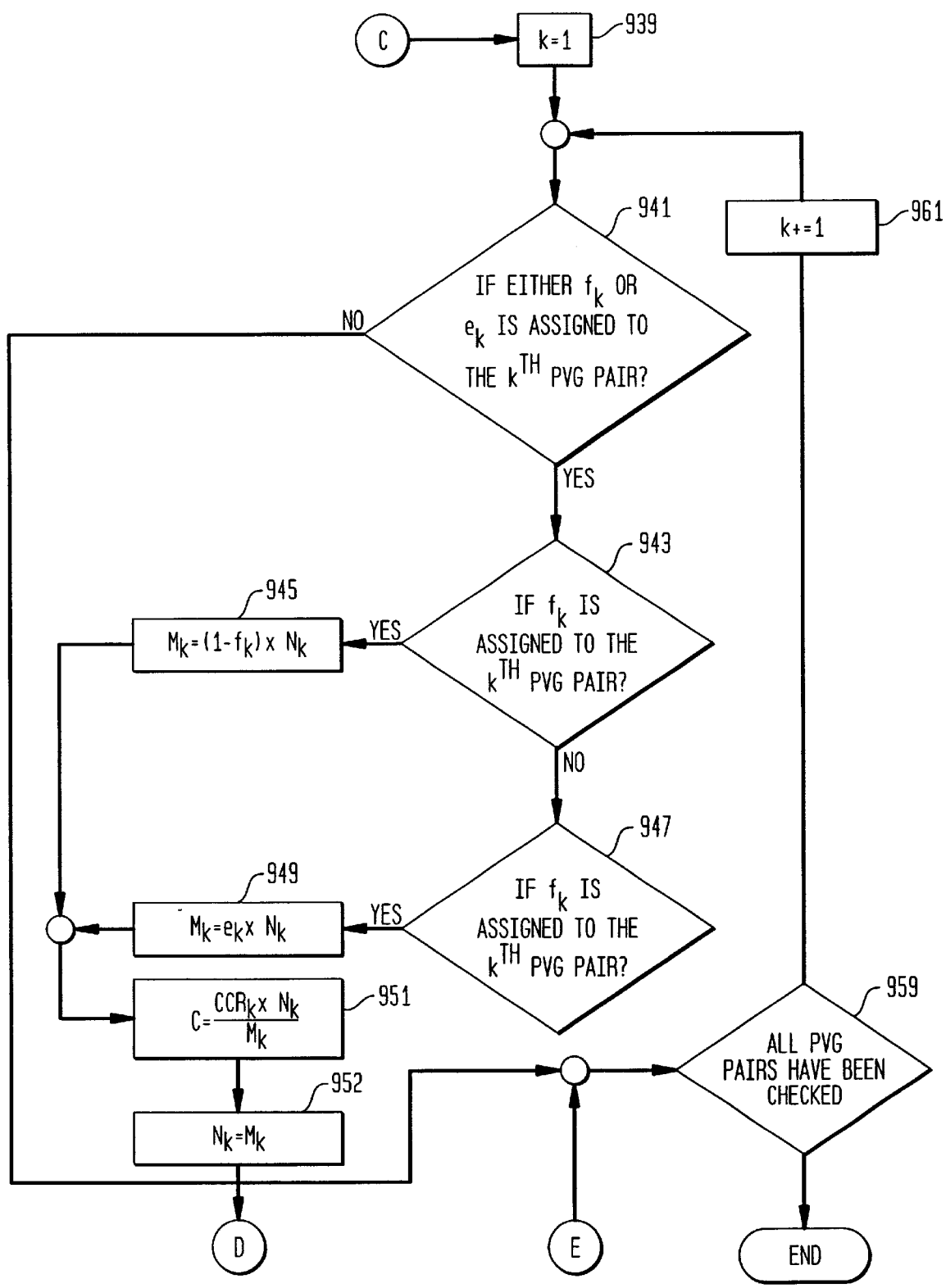
Figure 9D:
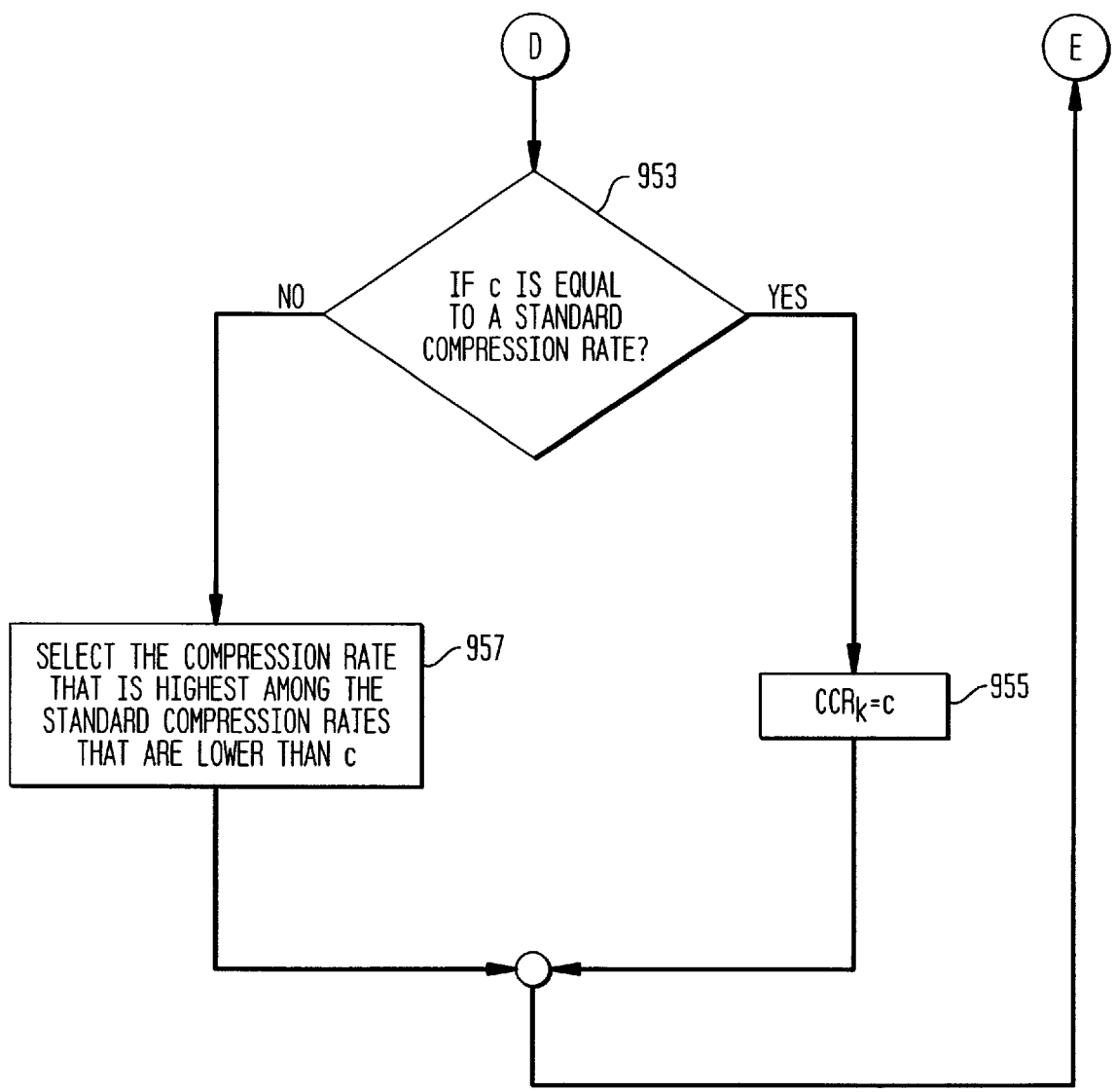

FIG. 9, comprising portions 9A, 9B, 9C and 9D, is a flow diagram illustrating the use of voice compression as the congestion control mechanism in an IP network. This diagram illustrates a level-1 embodiment. The voice compression processing may be used independently for congestion relief or in conjunction with any of the other congestion relief mechanisms discussed herein. As was the case with respect to call gapping and rerouting in the peripheral domain as discussed above in connection with FIG. 8, the RTP protocol does not provide significant information with respect to voice compression. Accordingly, the steps of the process are essentially the same whether or not the embodiment is RTP aware. Thus, FIG. 9 is generic to both RTP aware and RTP unaware embodiments.

Variables are defined in block 900. In step 901, variable i, which represents a port of the network is set to 1. In step 903, the $i^{th}$ port is selected. In step 905, the set $R_i$ of PVG pairs contributing traffic to the presently selected port (the $i^{th}$ port) is determined from the available topological and routing information. In step 907, the number of calls, C, that can be accommodated at that port is determined by multiplying the capacity of the port by a utilization threshold selected by the network administrator. The utilization threshold, $U_i$, is a fraction, for instance, 0.8, of the total physical capacity of that port that the administrator finds acceptable. In step 909, the number of calls per second, $\alpha_C$, that can be accommodated at that port based on the calculated value C is determined by solving equation 1a for $\alpha_C$. In step 911, the calls per second that are presently passing through that port, $\alpha_A$, is determined by summing the calls per second through each of the PVG pairs contributing to the traffic at that port.

In decision step 913, the under-utilized ports are segregated from the over-utilized ports. As discussed above in connection with FIG. 8, the criteria used to make the decision depends on whether the network is RTP aware or unaware. If RTP aware, then delay jitter per call and packet loss per call data is compared to predetermined thresholds. Otherwise, more indirect evidence of congestion is used. The under-utilized ports are processed through steps 915–923, while the over-utilized ports are processed through steps 925–933. The processing through the two routes is very similar in that a bandwidth correction factor (either an incremental factor, $p_G$, if the present utilization is less than the threshold, or a reduction factor, $p_B$, if the present utilization is greater than the threshold) is determined for each PVG pair in set R. Specifically, in step 915 (or 925), a bandwidth reduction (or incremental) factor is calculated for the $i^{th}$ port. With respect to the reduction factor $p_B$ (step 925), this value represents the fraction of calls through the th port that would need to be blocked in the absence of voice compression. With respect to the incremental factor $p_G$ (step 915), this value represents the fraction of calls that can be added through the $i^{th}$ port without inducing a need to implement call blocking in the absence of voice compression.

Then, in steps 927–933, the bandwidth reduction factor, f, for each PVG pair contributing traffic to the $i^{th}$ port is assigned by taking the largest of the reduction factors $p_B$ of all of the overly congested ports to which each PVG pair contributes traffic. In other words, if the traffic between a given PVG pair passes through m ports, it is assigned a bandwidth reduction factor of max ($p_{B,1}, p_{B,2}, p_{B,3}, p_{B,4}, \ldots p_{B,m}$) Likewise, in steps 917–923, a bandwidth incremental factor, e, for each PVG pair contributing traffic to the $i^{th}$ port is assigned by taking the smallest of the incremental factors $p_G$ of all of the under utilized ports to which each PVG pair contributes. In other words, if the traffic between a given PVG pair passes through m under utilized ports, it is assigned a bandwidth incremental factor of min($p_{G,1}, p_{G,2}, p_{G,3}, p_{G,4}, \ldots p_{G,m}$).

Steps 917–923 and 927–933 are included because any PVG pair may be processed through steps 913–933 more than once because steps 913–933 will be traversed for every port in the network and any given PVG pair may be contributing traffic to more than one port in the network.

After all of the PVG pairs contributing traffic to port i have been processed through steps 913–933, flow proceeds to step 935, where it is determined if all of the ports have been processed. If not, flow proceeds to step 937, where i is incremented, and the next port is processed in accordance with steps 903–933.

When all ports have been so processed, flow instead proceeds from step 935 to step 939, where variable k is set to one. Variable k represents PVG pairs.

Another result of the fact that any given PVG pair could be contributing traffic to more than one port is that it is possible that the same PVG might have been assigned both a value for $p_B$ and a value for $p_G$ in steps 921 and 931, respectively. It also is possible that any given PVG pair may not have been contributing traffic to any of the ports and, therefore, not been assigned any $p_B$ or $p_G$. Thus, in step 941, it is first determined if the PVG pair was assigned either a $p_B$ or a $p_G$ value. If not, processing flows directly to decision step 959 where the procedure either ends if all PVG pairs have been processed, or k is incremented (step 961) and flow returns to step 941 for processing of the next PVG pair.

However, if, in step 941, either a $p_B$ or $p_G$ value was assigned, flow proceeds to decision step 943, where it is inquired whether this particular PVG pair was assigned a bandwidth reduction factor, f. If so, then, in step 945, a new, decreased, call capacity value, $M_j$, is assigned for that pair by multiplying the number of calls for which bandwidth is allocated to that pair, $N_k$, by the bandwidth reduction factor, f, assigned to that PVG pair in step 931. Any bandwidth incremental factor, e, that may have been assigned to that PVG pair is ignored if a bandwidth reduction factor, f, was assigned to that pair since, if any port to which that PVG pair was contributing traffic was over utilized, voice compression for that PVG pair should be increased regardless of traffic through other ports. If, on the other hand, no bandwidth reduction factor was assigned to that PVG pair, then it is determined if a bandwidth incremental factor, e, was assigned (step 947). Like step 647 in FIG. 6, step 947 is for illustrative purposes only since, if flow reaches step 947, the condition set forth therein must have been true. Hence, flow will proceed to step 949. In step 949, a new, decreased, call capacity, $M_k$, is assigned for that pair by multiplying the number of calls for which bandwidth is allocated to that pair by the bandwidth incremental factor e for that pair.

In either event, flow proceeds to step 951, where a new voice compression ratio is determined using the newly calculated call capacity, $M_k$, determined in step 945 or 949 that would maintain the call blocking probability below the predetermined threshold, T. Note that, if step 951 was reached through step 945, then the compression ratio will be increased in step 951 to relieve congestion. If, on the other hand, step 951 was reached through step 949, then the compression ratio will be decreased in step 951 since no port to which that PVG pair is contributing traffic is experiencing poor quality of service and thus the compression ratio being used, if any, may be decreased. In step 952, $N_k$ is set to $M_k$.

From step 952, flow proceeds to steps 953–957 where a new compression ratio is actually assigned to the PVG pair. Specifically, if the compression ratio c determined in step 951 is equal to a standard compression ratio, then that ratio is assigned to that PVG pair (step 955). If not, then the highest of the standard compression ratios that is less than c is assigned to that PVG pair (step 957). Flow then proceeds to step 959 for processing of the remaining PVG pairs, if any.

In accordance with the invention, a plurality of methods and apparatus for detecting congestion and implementing congestion relief mechanisms has been presented.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

We claim:

1. A method of determining call blocking parameters for relieving congestion in a packet-based network that is used to interconnect a plurality of other networks through a plurality of gateways, said method comprising the steps of:
   (1) identifying calls that are experiencing performance below a predetermined threshold;
   (2) identifying a set of pairs of gateways corresponding to said calls experiencing performance below said predetermined threshold;
   (3) calculating an average performance of all calls between each gateway pair in said set; and
   (4) generating, for each gateway pair in said set, data indicating that it should reject new calls between said gateway pair if said average performance is below said threshold and admit new calls if said average performance exceeds said threshold.

2. The method set forth in claim 1 wherein said threshold comprises a delay jitter parameter.

3. The method set forth in claim 1 wherein said threshold comprises a packet loss parameter.

4. The method set forth in claim 1 wherein said threshold comprises a delay jitter parameter and a packet loss parameter.

5. The method set forth in claim 1 wherein said threshold comprises a delay jitter parameter or a packet loss parameter.

6. The method set forth in claim 4 further comprising the step of:
   (5) for each gateway pair having no calls having performance below said threshold, admitting new calls.

7. The method set forth in claim 6 wherein said network is an internet protocol network.

8. The method set forth in claim 7 wherein said network operates using the Real time Protocol: RFC 1889, "RTP: A Transport Protocol for Real-time Applications."

9. The method set forth in claim 1 further comprising the step of:
   (6) forwarding information as to whether new calls should be admitted or rejected to said gateways for implementation.

10. The method set forth in claim 1 further comprising the step of:
    (7) remotely controlling said gateways to admit or reject new calls based on said data generated in step (4).

11. The method set forth in claim 1 wherein step (4) comprises setting a flag corresponding to each gateway pair in said set.

12. A method for implementing call blocking to relieve congestion in a packet-based network that is used to interconnect a plurality of other networks through a plurality of gateway nodes, said network comprising a plurality of ports through which network traffic travels, said method comprising the steps of:
    (1) for each port in said network, identifying a set of pairs of gateway nodes contributing traffic to said port; and
    (2) identifying ports that are experiencing congestion above a predetermined threshold;
    (3) for each pair of gateway nodes contributing traffic to a port identified in step (2), assigning a call blocking probability to said pair of gateway nodes, said call blocking probability being a function of the fraction of calls between said pair of gateway nodes that would need to be blocked to meet said threshold corresponding to a port to which that pair of gateway nodes contributes traffic that is most congested.

13. The method set forth in claim 12 wherein said threshold is a function of accumulated number of calls that can pass through said port and wherein step (2) comprises:
  (2.1) determining the accumulated number of calls passing through said port; and
  (2.2) comparing said accumulated number of calls to said threshold.

14. The method set forth in claim 13 wherein step (2.1) comprises summing the number of calls between each pair of gateway nodes contributing traffic to said port.

15. The method set forth in claim 13 wherein step (3) comprises:
  (3.1) for each port identified in step (2), determining the number of calls per second that can be accommodated at said port without exceeding said threshold;
  (3.2) for each port that is experiencing congestion above a predetermined threshold, determining the ratio by which the actual number of calls per second through said port exceeds said threshold;
  (3.3) for each pair of gateway nodes that is contributing traffic to at least one congested port, assigning to said pair of gateway nodes the call blocking probability corresponding to the port to which it is contributing traffic that is most congested.

16. The method set forth in claim 15 wherein step (3.1) comprises solving:

$$T = \frac{(\alpha_c/\mu)^c / C!}{\sum_{n=0}^{c} (\alpha_c/\mu)^n / n!}$$

for $\alpha_C$, where
  C is a number of calls that can be accommodated at the port as determined by said threshold,
  $1/\mu$ is an average holding time per call,
  $\alpha_C$ is said number of calls per second that can be accommodated at that port; and
  T=a blocking interval.

17. The method set forth in claim 16 wherein step (3.2) comprises the step of solving $$\alpha_A = \sum_{j=0}^{m-1} \lambda_{Ri,j}$$

where $\alpha_A$ is an average arrival rate for calls between pairs of gateway nodes, $R_i$, in said set of gateway nodes contributing traffic to said port, i;
  $\lambda$=call arrival rate
  $R_i$=gateway node pair contributing traffic to port i; and
  m=number of gateway node pairs contributing traffic to port i.

18. The method set forth in claim 17 wherein said threshold is a fraction of said accumulated number of calls that can pass through said port.

19. The method set forth in claim 17 wherein said blocking probability is determined via:

$$B_{ik} = \frac{(\lambda_i/\mu) M_{ik} / M_{ik}!}{\sum_{n=0}^{M_{ik}} (\lambda_{ik}/\mu)^n / n!}$$

wherein $M_k$ is a number of channels corresponding to said call blocking probability for PVG pair k determined in step (3);
  $\lambda_k$=call arrival rate for $k^{th}$ PVG pair; and
  $B_k$=blocking probability assigned to the $k^{th}$ PVG pair.

20. The method set forth in claim 17 wherein said network is an Internet protocol network.

21. The method set forth in claim 17 further comprising the steps of:
  (4) identifying ports that are experiencing traffic below said predetermined threshold;
  (5) for each pair of gateway nodes contributing traffic to a port identified in step (4), assigning a call blocking probability to said pair of gateway nodes, said call blocking probability being a function of the fraction of calls that would need to be added between said pair of gateway nodes in order to exceed said threshold corresponding to the port to which that pair of gateway nodes contributes traffic that is most congested.

22. The method set forth in claim 12 further comprising the step of:
  (6) forwarding information as to whether new calls should be admitted or rejected to said gateways for implementation.

23. The method set forth in claim 12 further comprising the step of:
  (7) remotely controlling said gateways to admit or reject new calls based on said data generated in step (3).

24. An apparatus for implementing call blocking to relieve congestion in a packet-based network that is used to interconnect a plurality of other networks through a plurality of gateways, said apparatus comprising:
  means for identifying calls that are experiencing performance below a predetermined threshold;
  means for identifying a set of pairs of gateways corresponding to calls experiencing performance below said predetermined threshold;
  means for calculating an average performance of all calls between each gateway pair in said set; and
  means for generating, for each gateway pair in said set, data indicating that it should reject new calls between said gateway pair if said average performance is below said threshold and admitting new calls if said average performance exceeds said threshold.

25. The apparatus set forth in claim 24 wherein said threshold comprises a delay jitter parameter.

26. The apparatus set forth in claim 24 wherein said threshold comprises packet loss parameter.

27. The apparatus set forth in claim 24 wherein said threshold comprises a delay jitter parameter and a packet loss parameter.

28. The apparatus set forth in claim 24 wherein said threshold comprises a delay jitter parameter or a packet loss parameter.

29. The apparatus set forth in claim 27 further comprising:
  (5) means for admitting new calls for each gateway pair having no calls having performance below said threshold.

30. The apparatus set forth in claim 29 wherein said network is an internet protocol network.

31. The apparatus set forth in claim 30 wherein said network operates using the Real time Protocol: RFC 1889, "RTP: A Transport Protocol for Real-time Applications."

32. The method set forth in claim 24 wherein each of said means is comprises of a data processing device.

33. The apparatus set forth in claim 24 further comprising:
  means for forwarding information as to whether new calls should be admitted or rejected to said gateways for implementation.

34. The apparatus set forth in claim 24 further comprising:
means for remotely controlling said gateways to admit or reject new calls based on said data generated in said means for generating.

35. An apparatus for implementing call blocking to relieve congestion in a packet-based network that is used to interconnect a plurality of other networks through a plurality of gateway nodes, said network comprising a plurality of ports through which network traffic travels, said apparatus comprising:
means for identifying ports that are experiencing congestion above a predetermined threshold;
first means for identifying, for each gateway node identified by said means for identifying ports, a set of pairs of gateway nodes contributing traffic to said port; and
means for assigning to each pair of nodes identified by said first means for identifying pairs of gateway nodes a call blocking probability to said pair of gateway nodes, said call blocking probability being a function of the fraction of calls between said pair of gateway nodes that would need to be blocked to meet said threshold corresponding to the port to which that pair of gateway nodes contributes traffic that is most congested.

36. The apparatus set forth in claim 35 wherein said means for identifying ports comprises:
means for determining the accumulated number of calls passing through said port; and
means for comparing said accumulated number of calls to said threshold.

37. The apparatus set forth in claim 36 wherein said means for assigning comprises:
means for determining, for each port identified by said means for identifying ports, the number of calls per second that can be accommodated at said port without exceeding said threshold;
means for determining, for each port identified by said means for identifying ports, the ratio by which the actual number of calls per second through said port exceeds said threshold;
means for assigning to each pair of gateway nodes contributing traffic to said port the call blocking probability corresponding to the port to which it is contributing traffic that is most congested.

38. The apparatus set forth in claim 37 wherein said number of calls per second that can be accommodated at said port without exceeding said threshold is determined by solving:

$$T = \frac{(\alpha_c/\mu)^c / C!}{\sum_{n=0}^{c} (\alpha_c/\mu)^n / n!}$$

for $\alpha_C$, where
C is a number of calls that can be accommodated at the port as determined by said threshold,
$1/\mu$ is an average holding time per call,
$\alpha_C$ is said number of calls per second that can be accommodated at that port; and
T=a blocking interval.

39. The method set forth in claim 38 wherein said means for determining the ratio by which the actual number of calls per second through said port exceeds said threshold solves $$\alpha_A = \sum_{j=0}^{m-1} \lambda_{R i, j}$$

where $\alpha_A$ is an average arrival rate of calls between pairs of gateway nodes, $R_i$, in said set of pairs of gateway nodes, contributing traffic to said port i;
$\lambda$=call arrival rate;
$R_i$=gateway node pair contributing traffic to port i;
m=number of gateway node pairs contributing traffic to port i.

40. The apparatus set forth in claim 39 wherein said threshold is a fraction of said capacity of said port.

41. The apparatus set forth in claim 39 wherein said blocking probability is determined via:

$$B_{ik} = \frac{(\lambda_i/\mu)^{M_{ik}} / M_{ik}!}{\sum_{n=0}^{M_{ik}} (\lambda_{ik}/\mu)^n / n!}$$

wherein $M_k$ is a number of channels corresponding to said call blocking probability for PVG pair k;
$\lambda$=call arrival rate for $K^{th}$ PVG pair; and
$B_k$=blocking probability assigned to the $k^{th}$ PVG pair.

42. The apparatus set forth in claim 39 wherein said network is an Internet protocol network.

43. The apparatus set forth in claim 39 further comprising:
means for identifying ports that are experiencing traffic below said predetermined threshold;
second means for identifying, for each port experiencing traffic below said predetermined threshold, a set of pairs of gateway nodes contributing traffic to said port; and
means for assigning a call blocking probability to each pair of gateway nodes identified by said second means for identifying pairs of gateway nodes said call blocking probability being a function of the fraction of calls between said pair of gateway nodes that would need to be blocked to meet said utilization threshold corresponding to the port to which that pair of gateway nodes contributes traffic that is least congested.

44. The method set forth in claim 35 further comprising:
means for forwarding information as to whether new calls should be admitted or rejected to said gateways for implementation.

45. The method set forth in claim 35 further comprising:
means for remotely controlling said gateways to admit or reject new calls based on said data generated by said means for assigning.

* * * * *